United States Patent
Scholeno

(12) 
(10) Patent No.: US 8,823,540 B2
(45) Date of Patent: Sep. 2, 2014

(54) ELECTRICAL ASSEMBLY WITH CONNECTOR-SUPPORTED LIGHT PIPE AND PASS THROUGH HEAT SINK

(75) Inventor: Michael Scholeno, York, PA (US)

(73) Assignee: FCI Americas Technology LLC, Carson City, NV (US)

( * ) Notice: Subject to any disclaimer, the term of this patent is extended or adjusted under 35 U.S.C. 154(b) by 273 days.

(21) Appl. No.: 13/333,190

(22) Filed: Dec. 21, 2011

(65) Prior Publication Data

US 2012/0155108 A1    Jun. 21, 2012

Related U.S. Application Data

(60) Provisional application No. 61/425,734, filed on Dec. 21, 2010.

(51) Int. Cl.
| | |
|---|---|
| *G08B 5/00* | (2006.01) |
| *H01R 12/71* | (2011.01) |
| *H04B 10/80* | (2013.01) |
| *G02B 6/42* | (2006.01) |
| *H01R 13/717* | (2006.01) |
| *H01R 13/6594* | (2011.01) |

(52) U.S. Cl.
CPC ............ *H01R 12/716* (2013.01); *H04B 10/801* (2013.01); *G02B 6/4298* (2013.01); *G02B 6/0008* (2013.01); *H01R 13/7172* (2013.01); *H01R 13/6594* (2013.01)
USPC .................. 340/815.42; 340/815.4; 439/490; 361/719; 362/581

(58) Field of Classification Search
USPC ............... 340/815.42, 815.4, 815.45; 439/80, 439/346, 487, 489, 490, 620; 361/715, 719; 362/581
See application file for complete search history.

(56) References Cited

U.S. PATENT DOCUMENTS

| | | |
|---|---|---|
| 5,704,802 A | 1/1998 | Loudermilk |
| 5,876,239 A | 3/1999 | Morin et al. |
| 5,885,100 A | 3/1999 | Talend et al. |
| 5,915,993 A | 6/1999 | Belopolsky et al. |
| 6,113,422 A * | 9/2000 | Somerville et al. ........... 439/490 |
| 6,152,762 A | 11/2000 | Marshall et al. |
| 6,264,499 B1 | 7/2001 | Costello et al. |
| 6,623,292 B1 | 9/2003 | Holler et al. |
| 7,070,446 B2 | 7/2006 | Henry et al. |
| 7,074,082 B2 | 7/2006 | Kerlin et al. |
| 7,175,327 B1 | 2/2007 | Tsai |
| 7,249,966 B2 | 7/2007 | Long |

(Continued)

OTHER PUBLICATIONS

Molex, "iPass +™ HD (High Density) Interconnect", http://www.molex.com/molex/prodcuts/family?key=ipass___interconnect&channel=pro..., accessed date Jan. 28, 2011, 2 pages.

*Primary Examiner* — Anh V La
(74) *Attorney, Agent, or Firm* — Baker & Hostetler LLP

(57) ABSTRACT

An electrical assembly includes a guide frame with closed and open ends, the guide frame configured to be mounted to a substrate. The guide frame defines at least one cavity configured to receive an electrical component therein. A connector housing configured to be disposed in the at least one cavity and mounted to the substrate can support a retainer that extends outwardly from a body of the connector housing. The retainer can be configured to receive an attachment member supported by a light pipe, and can extend outwardly through the closed end of the guide frame. A heat sink coupled to the guide frame can be configured to have at least a portion of the light pipe disposed therein.

30 Claims, 18 Drawing Sheets

(56) References Cited

U.S. PATENT DOCUMENTS

| | | |
|---|---|---|
| 7,390,212 B1 | 6/2008 | Yang |
| 7,467,972 B2 | 12/2008 | Long |
| 7,529,094 B2 | 5/2009 | Miller |
| 7,574,471 B2 | 8/2009 | Fotta et al. |
| 7,601,021 B1 | 10/2009 | Yang |
| 7,621,773 B2 | 11/2009 | Bright et al. |
| 7,651,364 B2 | 1/2010 | Costello |
| 7,712,941 B2 | 5/2010 | Tai et al. |
| 2005/0148239 A1 | 7/2005 | Hull et al. |
| 2005/0255726 A1 | 11/2005 | Long |
| 2007/0253168 A1 | 11/2007 | Miller |
| 2007/0296066 A1 | 12/2007 | Shuey |
| 2008/0316729 A1 | 12/2008 | Rothermel et al. |
| 2010/0111476 A1* | 5/2010 | Shirk et al. .................. 385/53 |
| 2010/0178790 A1 | 7/2010 | Bright et al. |
| 2010/0183293 A1* | 7/2010 | Wang et al. .................. 398/9 |

\* cited by examiner

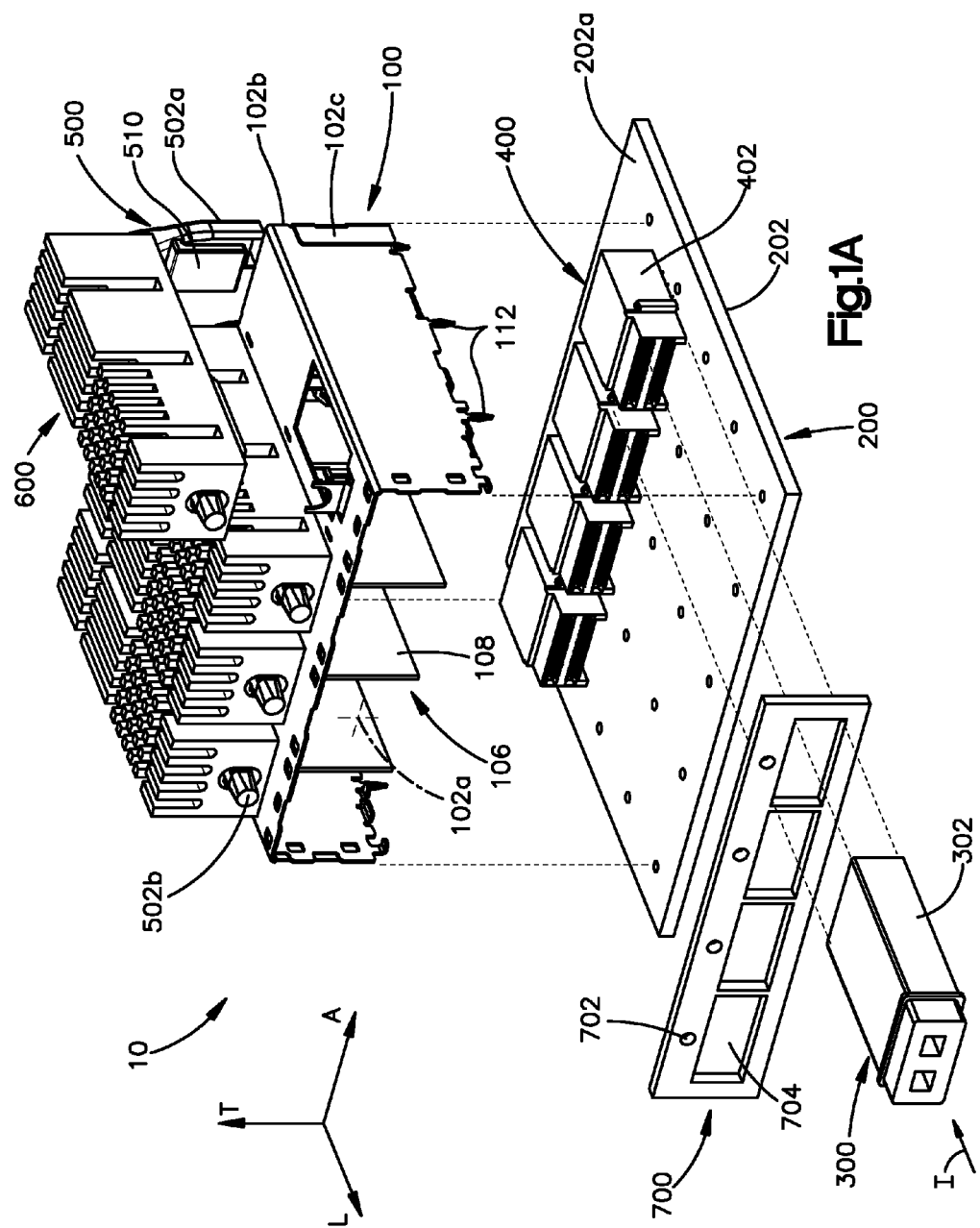

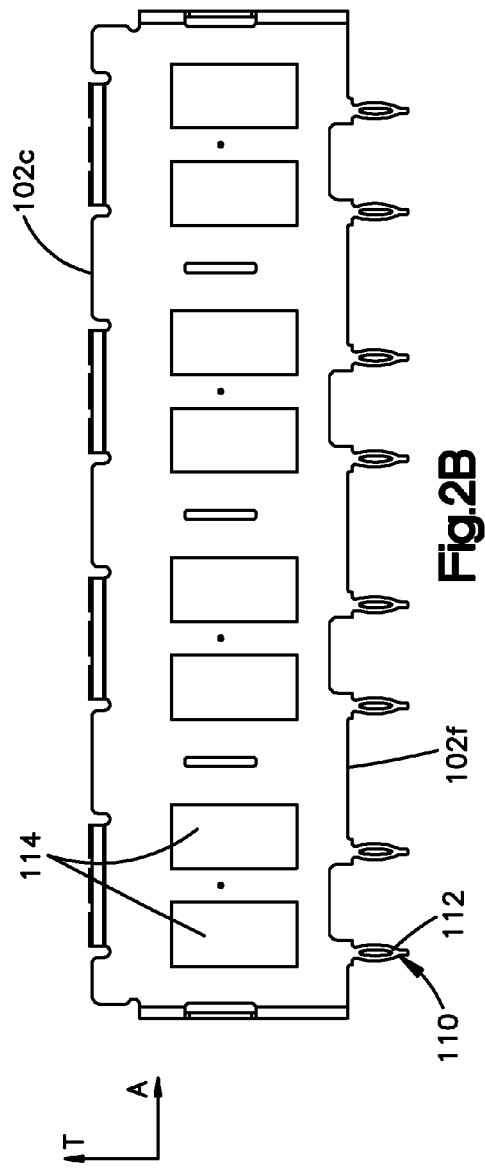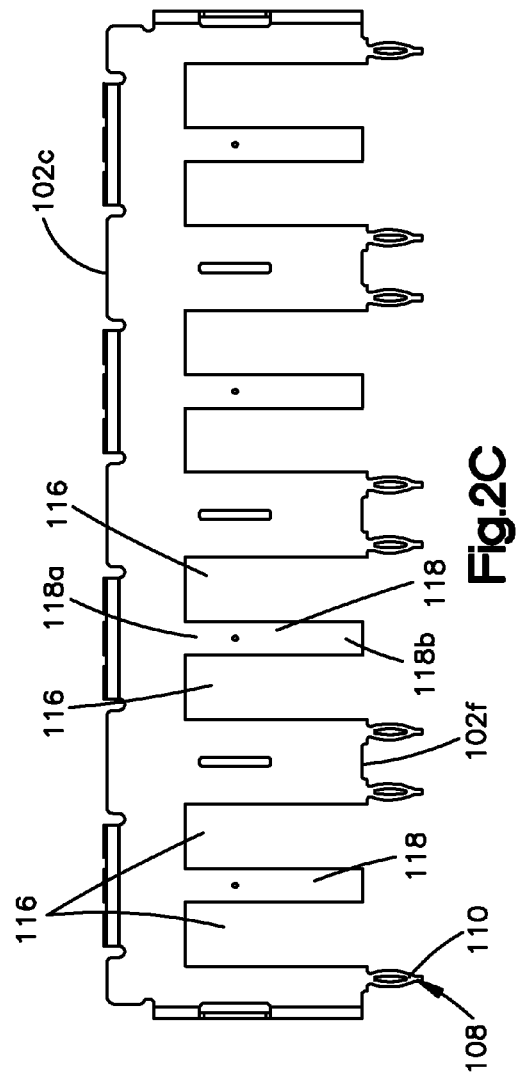

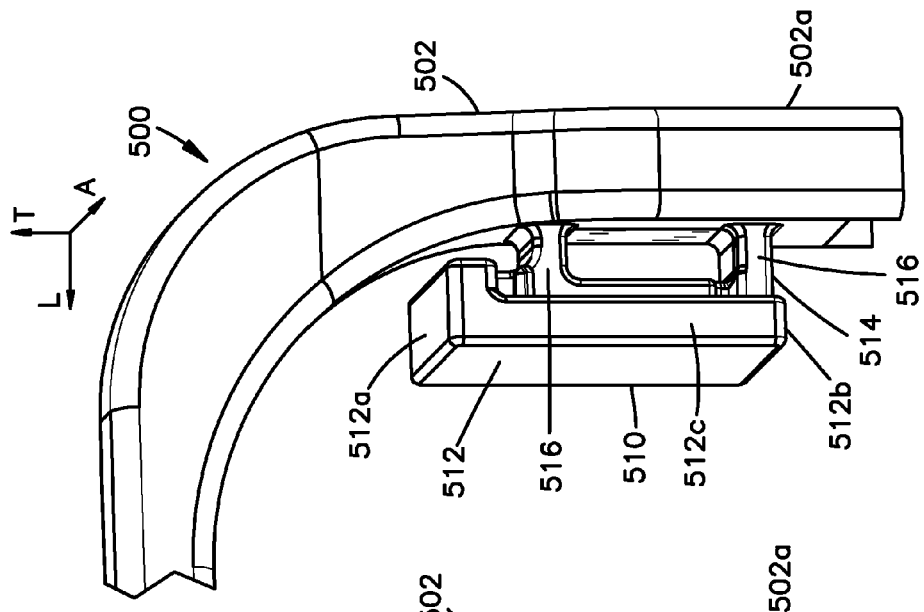
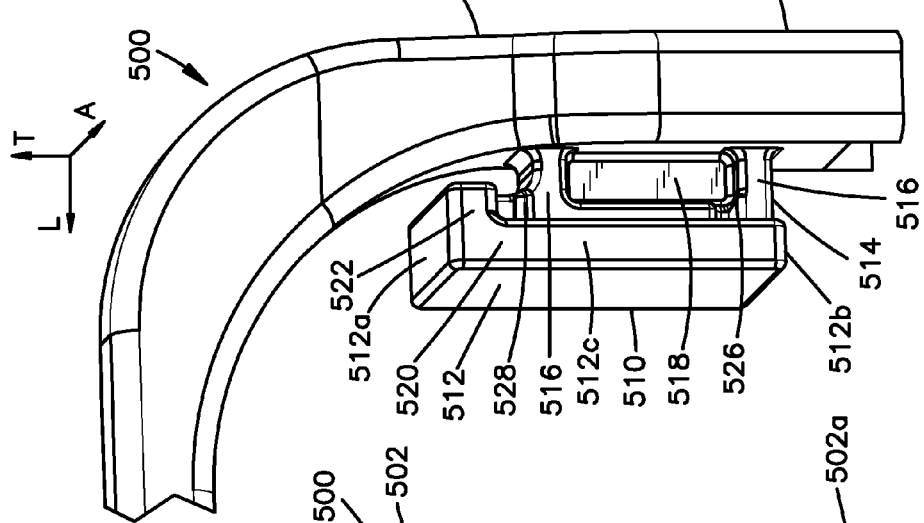
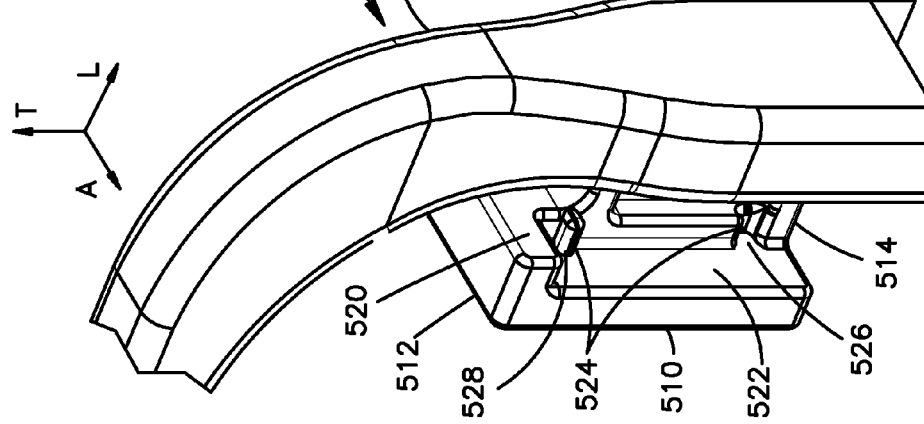

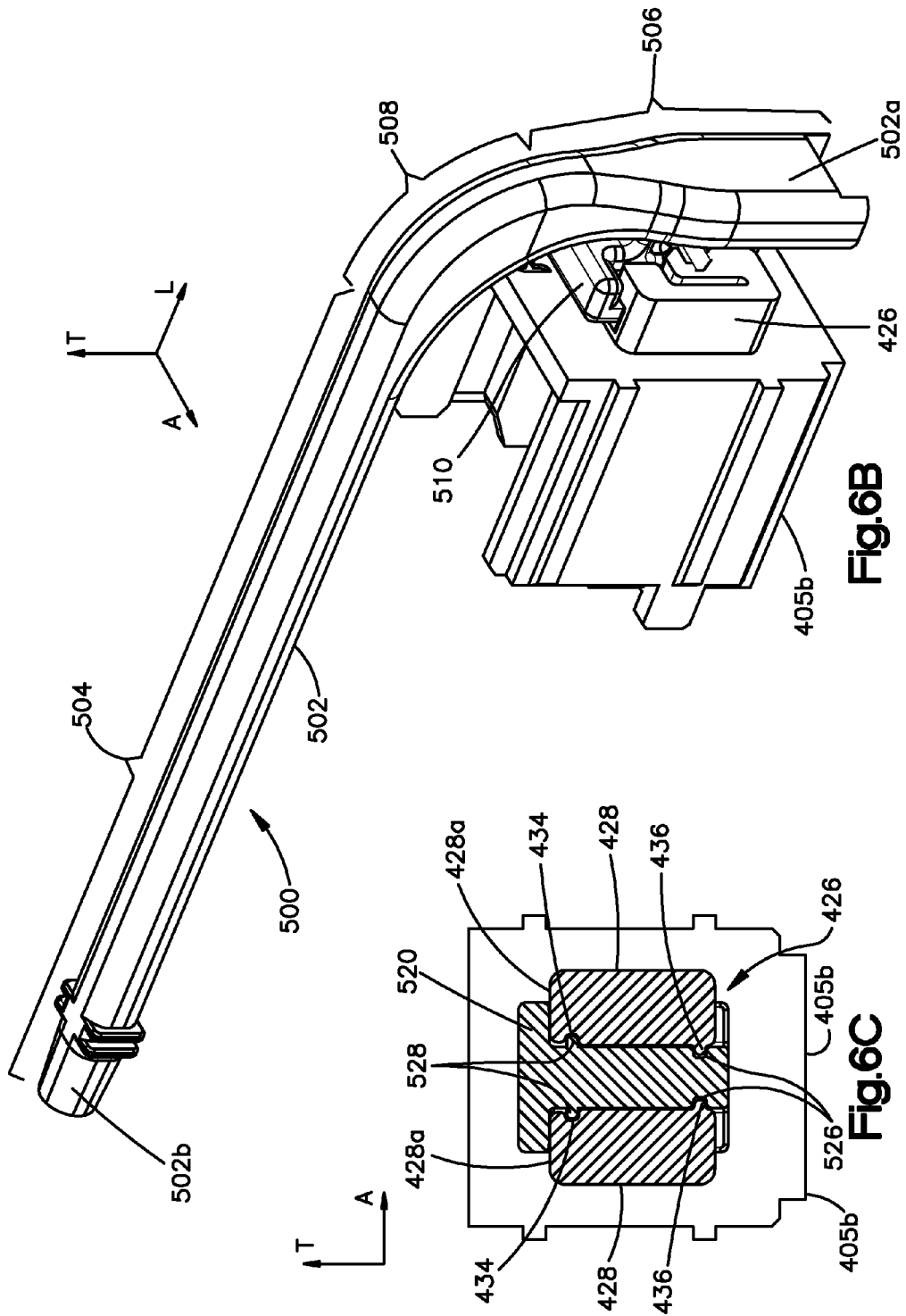

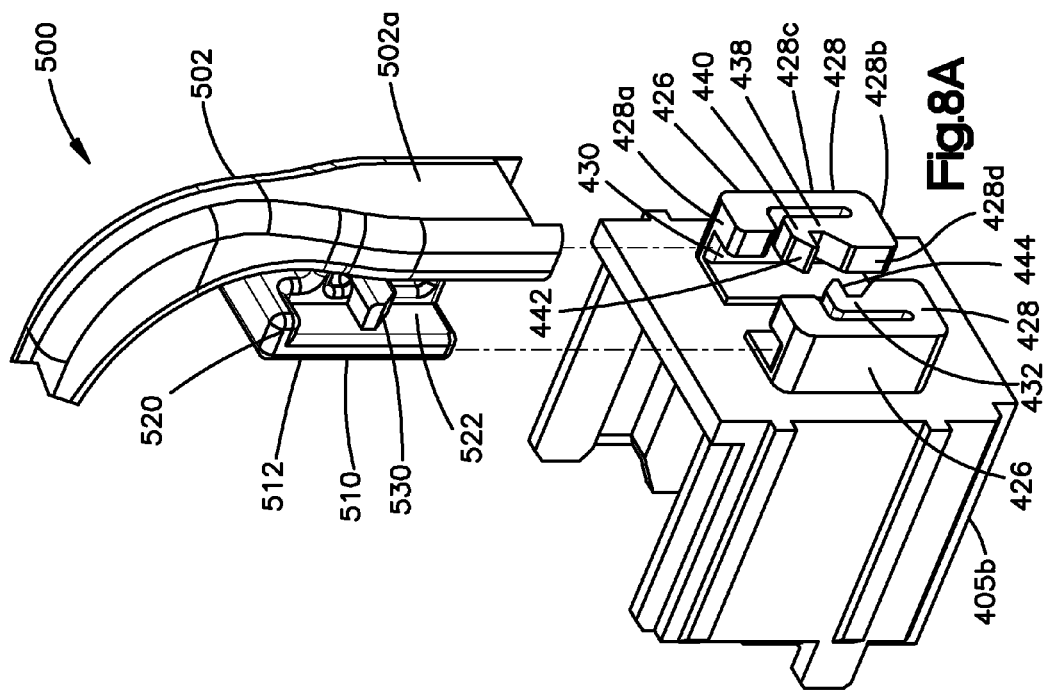
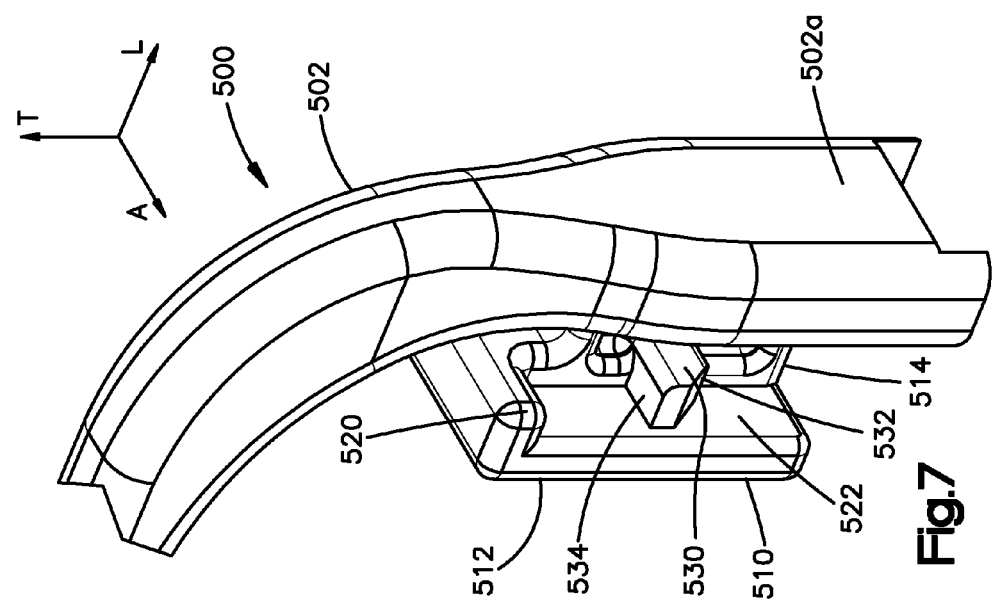

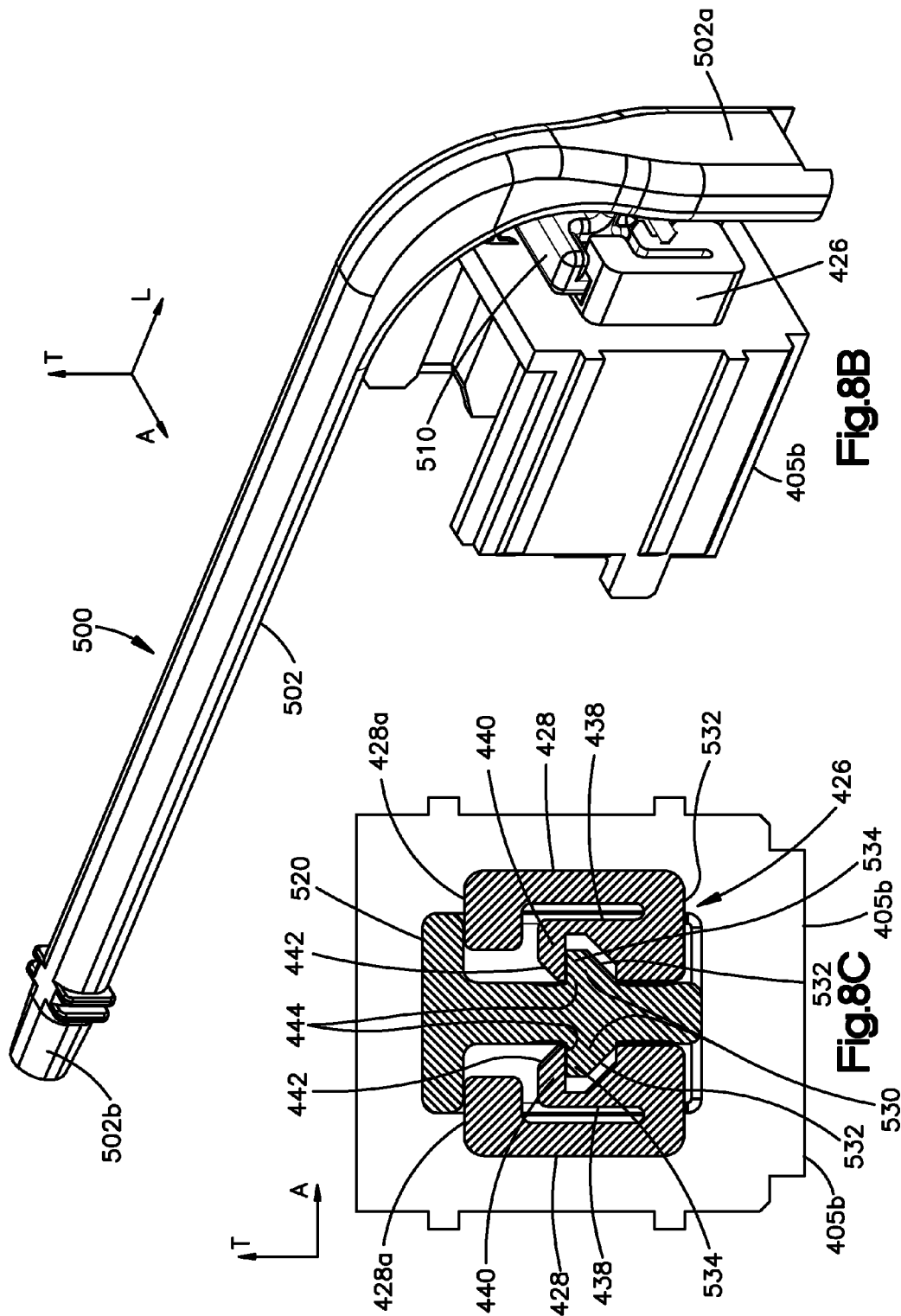

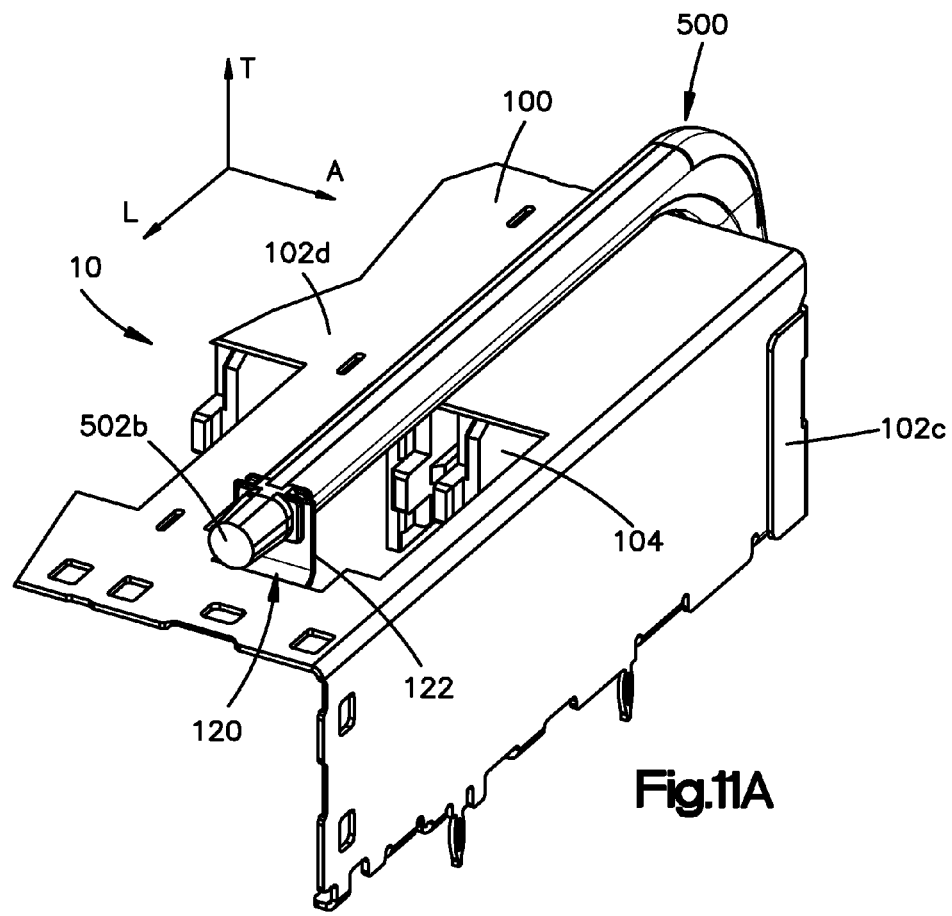
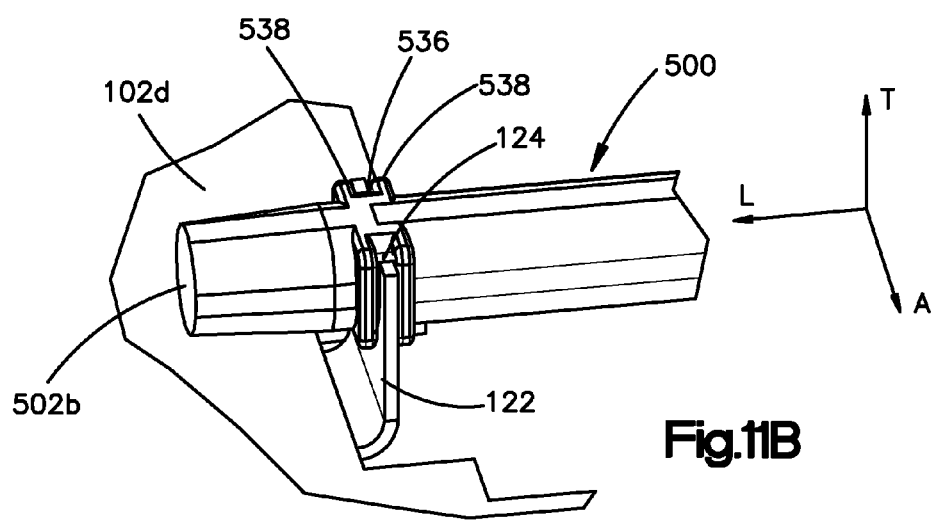

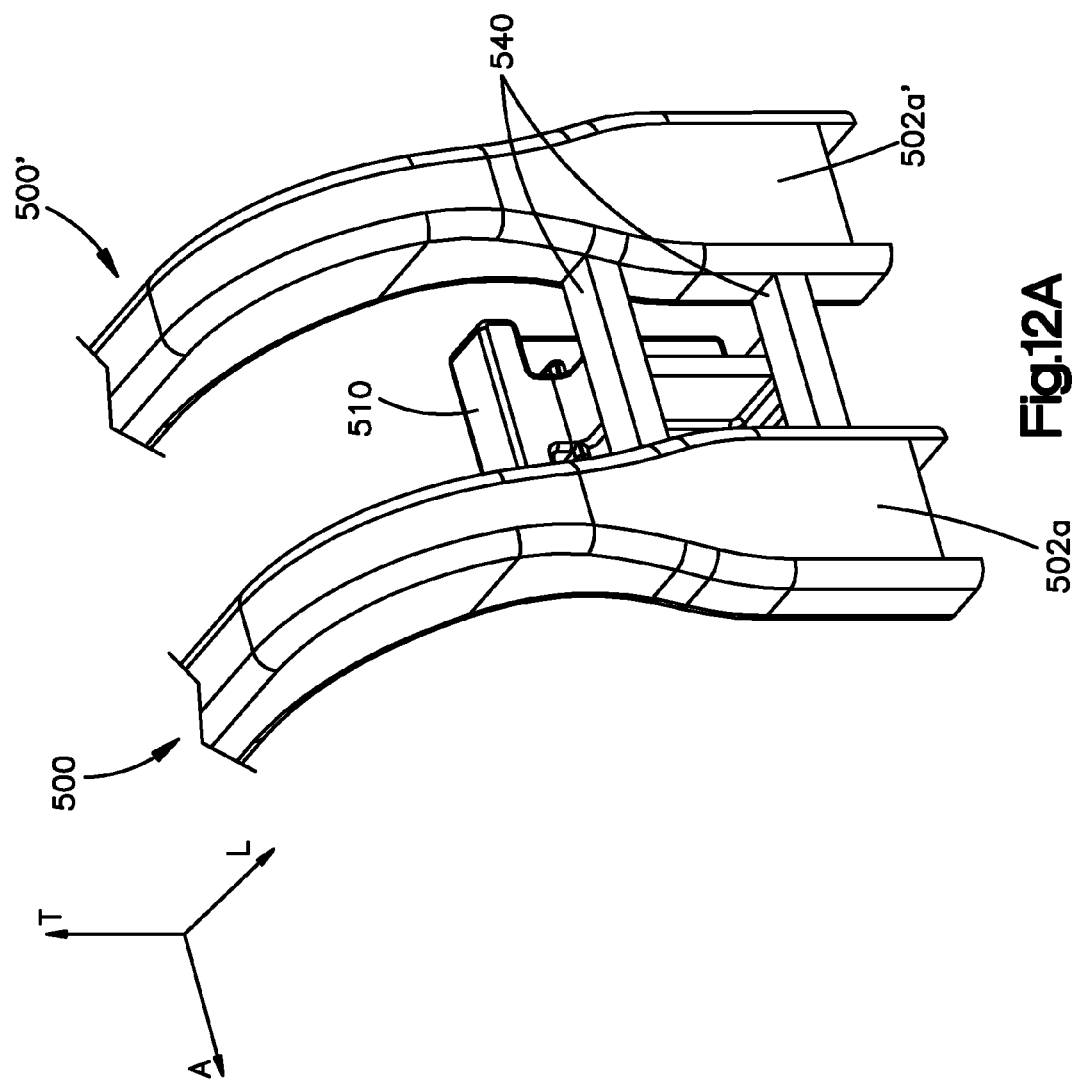

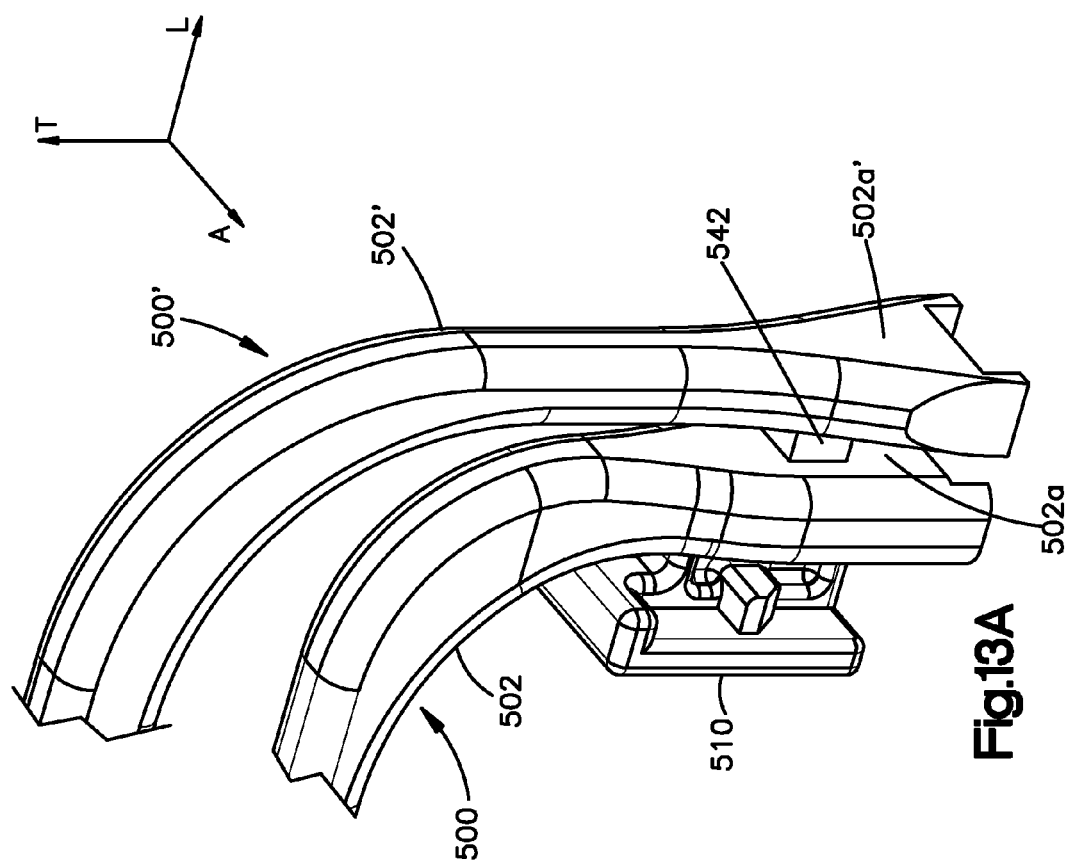

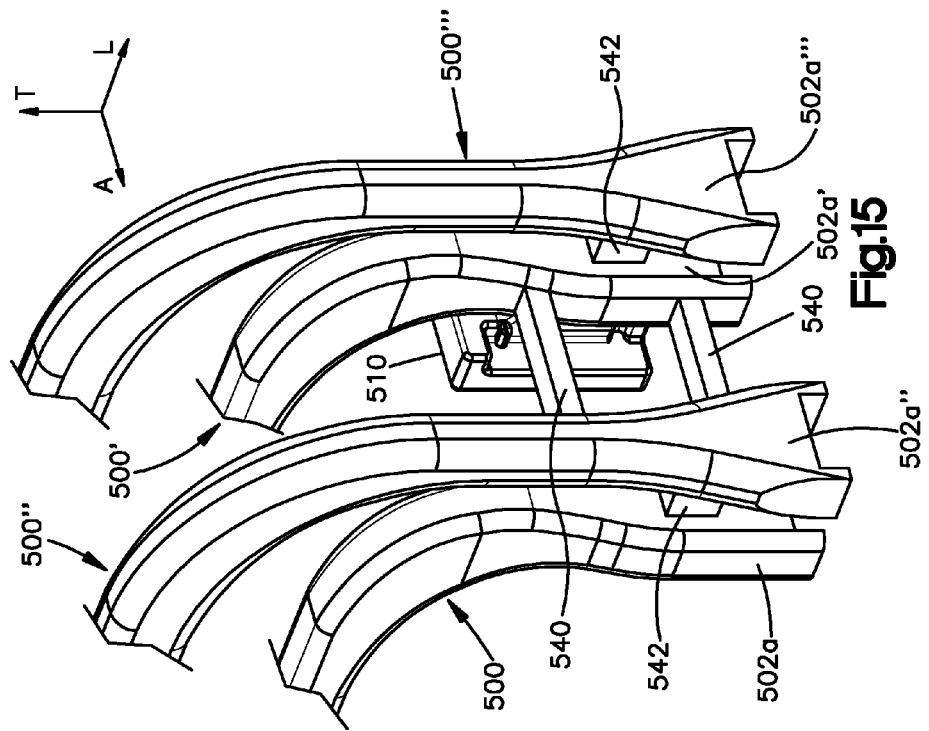
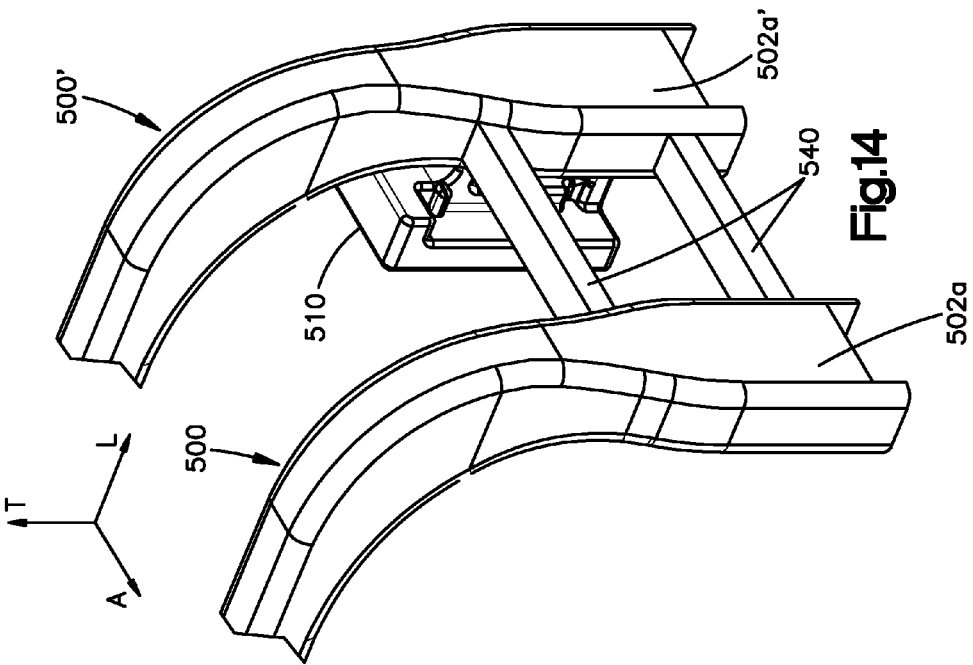

ELECTRICAL ASSEMBLY WITH CONNECTOR-SUPPORTED LIGHT PIPE AND PASS THROUGH HEAT SINK

CROSS-REFERENCE TO RELATED APPLICATIONS

This application claims the benefit of U.S. provisional patent application No. 61/425,734, filed Dec. 21, 2010, which is incorporated herein by reference in its entirety.

BACKGROUND

When configuring electrical assemblies, for example those used to facilitate data communication between connected electrical components, it is typically desirable to provide a visual indicator pertaining to the operation, status, etc. of the data communication connection. A typical method of providing such an indication is through the inclusion of one or more light emitting elements, for instance light emitting diodes (LEDs). Typically, LEDs are electrically connected to a surface of an underlying substrate, such as a printed circuit board, along with other components of the electrical assembly, and thus can be obscured from view.

Light pipes can be used to transport light emitted from LEDs at the surface of an underlying substrate to a position that is easily viewable. Light pipes are typically mounted to an outer cage, or guide frame, that encloses components of the electrical assembly, which may require special modification to the outer cage in order to attach the light pipes. Furthermore, light pipes can interfere with heat sinks that may be attached, for example, to the outer cage of an electrical assembly.

SUMMARY

In accordance with an embodiment, an electrical assembly can include a guide frame having a body that defines a first end and an opposed second end. The guide frame can define at least one cavity that extends between the first and second ends. The at least one cavity can be configured to at least partially receive an electrical component therein. The electrical assembly can further include a light pipe having a light pipe body that defines an optical conduit. The light pipe body can define a distal end disposed proximate the first end of the body and an opposed proximal end that is configured to receive light from a light emitting element electrically connected to the substrate. The electrical assembly can further include an electrical connector configured to be mounted to a substrate. The electrical connector can include a housing and a plurality of electrical contacts supported by the housing. The electrical contacts can be configured to mate with the electrical component so as to place the electrical component into electrical communication with the substrate. The electrical connector can include a retainer that extends outwardly from the connector housing and directly secures to the light pipe.

In accordance with an alternative embodiment, an electrical assembly can include a guide frame having a body that defines a first end and an opposed second end, and at least one cavity configured to receive an electrical component. The electrical assembly can further include an electrical connector configured to be mounted to a substrate. The electrical connector can include a connector housing and a plurality of electrical contacts that are supported by the connector housing. The electrical contacts can be configured to place the electrical component into electrical communication with the substrate when the electrical connector is mated to the electrical component. The electrical assembly can further include a light pipe having a distal end disposed proximate the first end of the body and an opposed proximal end configured to receive light from a light emitting element that is electrically connected to the substrate. The electrical assembly can further include a heat sink coupled to an upper wall of the guide frame. The heat sink can have a heat sink body and cooling members that extend from the heat sink body. The heat sink can define a bore that extends through the heat sink body. The bore can be configured to receive at least a portion of the light pipe.

BRIEF DESCRIPTION OF THE DRAWINGS

The foregoing summary, as well as the following detailed description of an example embodiment of the application, will be better understood when read in conjunction with the appended drawings, in which there is shown in the drawings example embodiments for the purposes of illustration. It should be understood, however, that the application is not limited to the precise arrangements and instrumentalities shown. In the drawings:

FIG. 1A is an exploded perspective view of an electrical assembly in accordance with an embodiment;

FIG. 2B is a rear elevation view of a rear wall of the guide frame illustrated in FIG. 2A;

FIG. 2C is a rear elevation view of the rear wall of the guide frame illustrated in FIG. 2A, constructed in accordance with an alternative embodiment;

FIG. 5A is a perspective view of a portion of a light pipe component of the electrical assembly illustrated in FIGS. 1A-B;

FIG. 5B is a perspective view of the portion of the light pipe illustrated in FIG. 5A;

FIG. 5C is a perspective view of the portion of the light pipe illustrated in FIG. 5A, constructed in accordance with an alternative embodiment;

FIG. 6B is a perspective view of the light pipe and the rear portion of the electrical connector housing as illustrated in FIG. 6A, coupled to one another;

FIG. 6C is a section view of an attachment member of the light pipe illustrated in FIGS. 5A-B, received in a retainer of the rear portion of the electrical connector housing, as illustrated in FIG. 6B;

FIG. 7 is a perspective view of a portion of a light pipe component of the electrical assembly illustrated in FIGS. 1A-B, constructed in accordance with an alternative embodiment;

FIG. 8A is a perspective view of the portion of the light pipe illustrated in FIG. 7 and a rear portion of an electrical connector housing constructed in accordance with an alternative embodiment, the rear portion of the electrical connector housing configured to couple to the proximal end of the light pipe;

FIG. 8B is a perspective view of the light pipe and the rear portion of the electrical connector housing as illustrated in FIG. 8A, coupled to one another;

FIG. 8C is a section view of an attachment member of the light pipe illustrated in FIG. 7, received in a retainer of the rear portion of the electrical connector housing, as illustrated in FIG. 8B;

FIG. 11A is a perspective view of the light pipe and the guide frame components of the electrical assembly illustrated in FIGS. 1A-B, with a distal end of the light pipe received in a mounting member that extends from the guide frame;

FIG. 11B is a zoomed perspective view of the distal end of the light pipe and the mounting member of the guide frame illustrated in FIG. 11A;

FIG. 12A is a perspective view of a light pipe constructed in accordance with an alternative embodiment, wherein the light pipe includes two light pipes connected to one another and disposed side by side relative to each other;

FIG. 13A is a perspective view of a light pipe constructed in accordance with another alternative embodiment, wherein the light pipe includes two light pipes connected to one another and disposed one in front of the other;

FIG. 14 is a perspective view of a light pipe constructed in accordance with still another alternative embodiment; and FIG. 15 is a perspective view of a light pipe constructed in accordance with still another alternative embodiment.

DETAILED DESCRIPTION

Figure 1B:
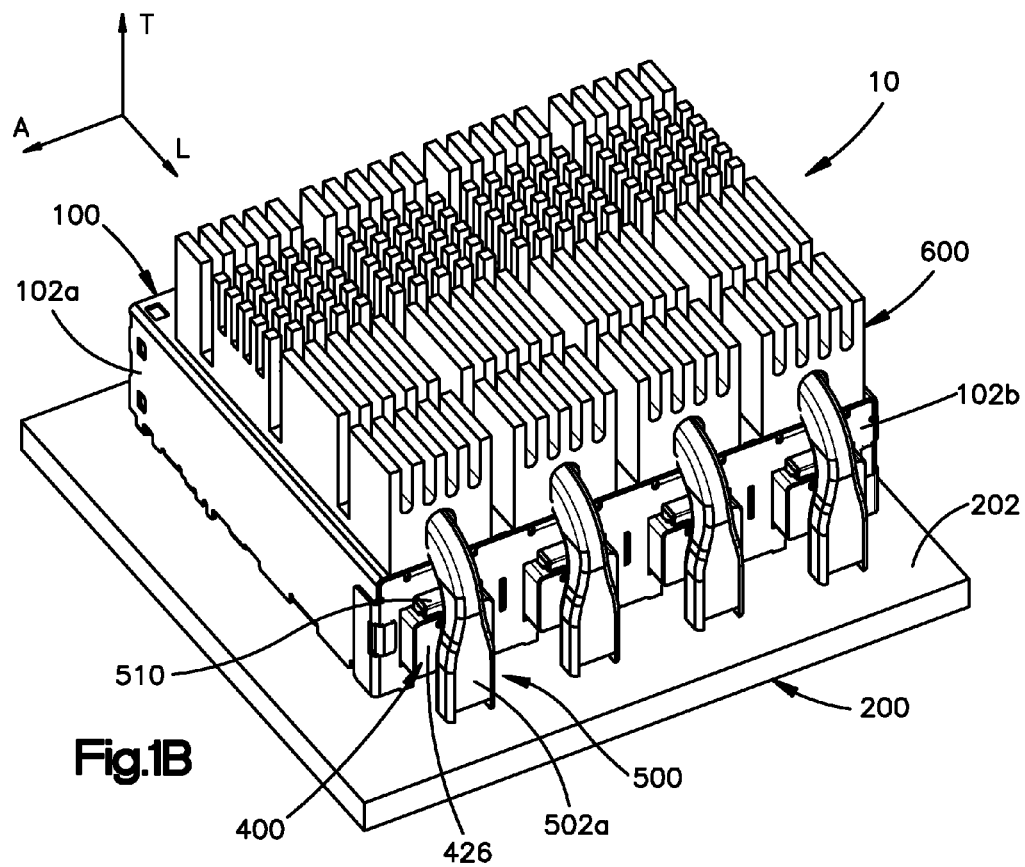
FIG. 1B is a perspective view of an assembled version of the electrical assembly illustrated in FIG. 1A.

Referring initially to FIGS. 1A-4, an electrical assembly 10 can include a substrate 200, a guide frame 100 that is configured to be mounted to the substrate 200, at least one electrical connector 400 that is configured to be mounted to the substrate 200 and includes a connector housing 402 and at least one electrical contact 406 supported by the connector housing 402, at least one light pipe 500 that can be configured to be supported by the connector housing 402 of the at least one electrical connector 400, at least one heat sink 600 that can be supported by the guide frame 100 and can further receive at least a portion of the at least one light pipe 500, a second electrical component 300 that can define one or more respective electrical connectors, such as an optical transceiver 302 that is configured to mate with the at least one electrical connector 400 and thus be placed in electrical communication with the substrate 200, and at least one bezel 700 that is configured to at least partially support the second electrical component 300. The bezel 700, which can also be referred to as a front panel, can be configured to be attached to the front end 102a of the guide frame 100. The bezel 700 can include a bezel body that defines respective pluralities of openings 702 and apertures 704 that extend through the body along the insertion direction I, the openings 702 configured to receive respective second electrical components 300 inserted into the guide frame 100.

In accordance with the illustrated embodiment, the substrate 200 can be a printed circuit board 202 having a body that defines an upper surface 202a to which components of the electrical assembly 10 can be mounted. The at least one electrical connector 400 can be constructed in any manner as desired, for instance as described in U.S. Pat. No. 7,070,446 to Henry, et al., which is hereby incorporated by reference as if set forth in its entirety herein. The electrical assembly 10 can be compliant with the T10 Committee SAS 2.1 specification, which is hereby incorporated by reference as if set forth in its entirety herein.

The guide frame 100 can also be referred to as a receptacle housing or a transceiver cage, and can have a guide frame body 102 that can define any suitable shape as desired, such as rectangular. The body 102 can define a first or front end 102a that can be open and an opposed second or rear end 102b that is spaced from the front end 102a along a longitudinal direction L. The rear end 102b can be at least partially closed, and can therefore be referred to as a closed end. The body 102 can include a rear wall 102c disposed at the rear end 102b of the body 102, an upper wall 102d, and opposed side walls 102e that are spaced from each other along a lateral direction A that extends substantially perpendicular to the longitudinal direction L. The rear wall 102c and the side walls 102e can extend downward from the upper wall 102d along a transverse direction T that extends substantially perpendicular to both the longitudinal direction L and the lateral direction A. The front end 102a can be configured so that one or more second electrical components 300 can be inserted into the guide frame 100 along an insertion direction L that extends substantially parallel to the longitudinal direction L. The guide frame 100 can be metallic, or can be constructed from any other suitable material as desired.

The upper wall 102d of the body 102 of the guide frame 100 can define at least one, such as a plurality of openings 104 that extend through the body 102, the openings 104 configured to receive respective portions of the heat sinks 600 therein, such that when a heat sink 600 is mounted to the upper wall 102d of the guide frame body 102, the heat sink 600 can make contact with, and thereby conduct heat away from, a respective second electrical component 300 inserted into the guide frame 100. It should be appreciated that the electrical assembly 10 is not limited to mounting the heat sinks 600 to the upper wall 102d of the guide frame 100, and that the heat sinks 600 can alternatively be attached, or mounted to any portion of the guide frame 100. It should further be appreciated that the heat sinks 600 can be mounted to the guide frame 100, for instance the upper wall 102d of the guide frame body 102, in a spring-loaded fashion, such that the heat sinks 600 can be resiliently biased relative to the guide frame 100 along the transverse direction T, for instance when a second electrical component 300 is inserted into the guide frame 100.

The body 102 of the guide frame 100 can further define at least one cavity 106, such as a plurality of cavities 106. Each cavity 106 of the plurality of cavities 106 can extend along the longitudinal direction L between the first and second ends 102a and 102b of the guide frame body 102, respectively. At least one, such as each of the cavities 106 can be configured to receive components of the electrical assembly 10 therein. For instance, at least one, such as each cavity 106 of the plurality of cavities 106 can be sized and configured such that a respective electrical connector 400 can be disposed in the at least one cavity 106. The at least one cavity 106 can further be configured to at least partially receive an electrical component, such as the second electrical component 300 therein. The respective electrical connector 400 can be disposed in the at least one cavity 106 in a position such that the respective electrical connector 400 can be mated to a respective second electrical component 300 inserted into and at least partially received within the at least one cavity 106. In accordance with the illustrated embodiment, the plurality of cavities 106 can be defined by laterally spaced divider walls 108. For instance, the cavities 106 are configured to receive the complementary second electrical component 300 at the front end 102a of the guide frame 100, and are configured to receive the connector housings 402 at the rear end 102b of the guide frame 100. The divider walls 108 can extend from the front and end 102a to the rear end 102b of the guide frame 100 along the longitudinal direction L, for instance between the front and rear ends 102a and 102b of the guide frame 100.

Figure 3A:
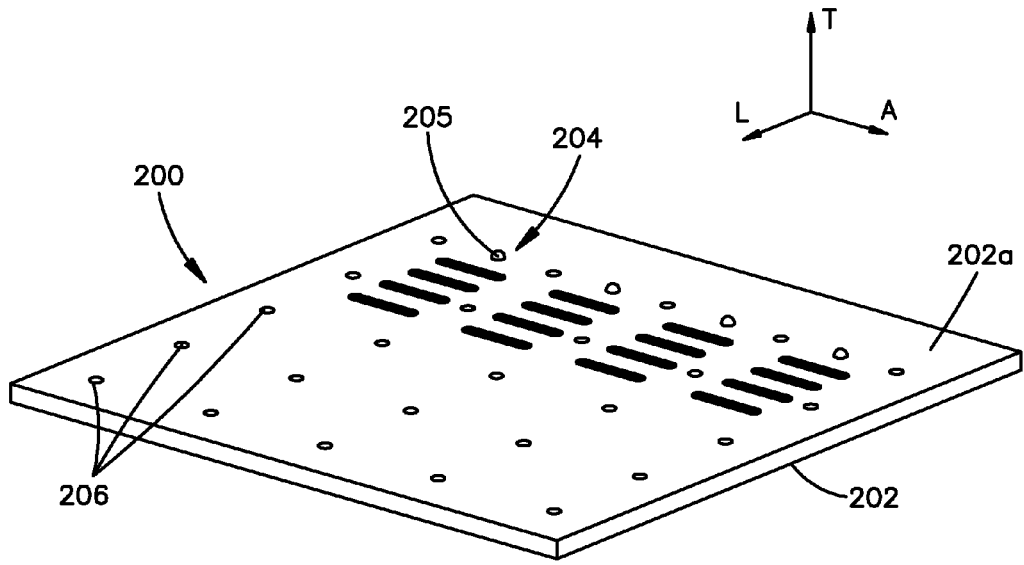
FIG. 3A is a perspective view of a substrate component of the electrical assembly illustrated in FIGS. 1A-B.
Figure 3B:
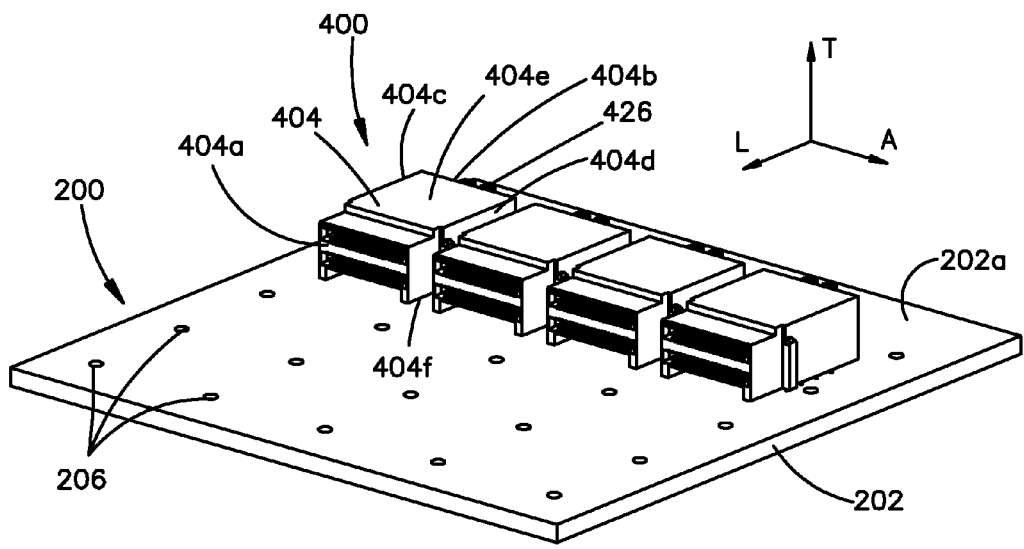
FIG. 3B is a perspective view of the substrate illustrated in FIG. 3A, with a plurality of electrical connector housings affixed thereto.

Referring now to FIGS. 3A-B, substrate-mounted components of the electrical assembly 10, for instance the electrical connectors 400 and the LEDs 205 can be mounted to the upper surface 202a of the printed circuit board 202, so as to place those components into electrical communication with electrical traces running along or through the printed circuit board 202. For example, the electrical connectors 400 and/or the LEDs 205 can be press-fit into the printed circuit board 202, for example into plated through-holes 206, surface mounted to the upper surface 202a of the printed circuit board 202, for instance via a reflow process, or otherwise mounted to the printed circuit board 202. The guide frame 100 can also be mounted to the printed circuit board 202. For example, the guide frame 100 can include a plurality of mounting members 110 configured to secure the guide frame 100 to the substrate 200. In accordance with the illustrated embodiment, the guide frame 100 includes a plurality of mounting members 110 in the form of press-fit tails 112 that extend downward from the body 102 and are configured to be inserted into respective through-holes 206 in the printed circuit board 202 when the guide frame 100 is mounted to the printed circuit board 202. The press-fit tails 112 can extend from any locations on the guide frame body 102, for instance from bottom edges 102f of the rear wall 102c and/or the side walls 102e. It should be appreciated that the guide frame 100 can be otherwise mounted to the printed circuit board 202 as desired.

Figure 4:
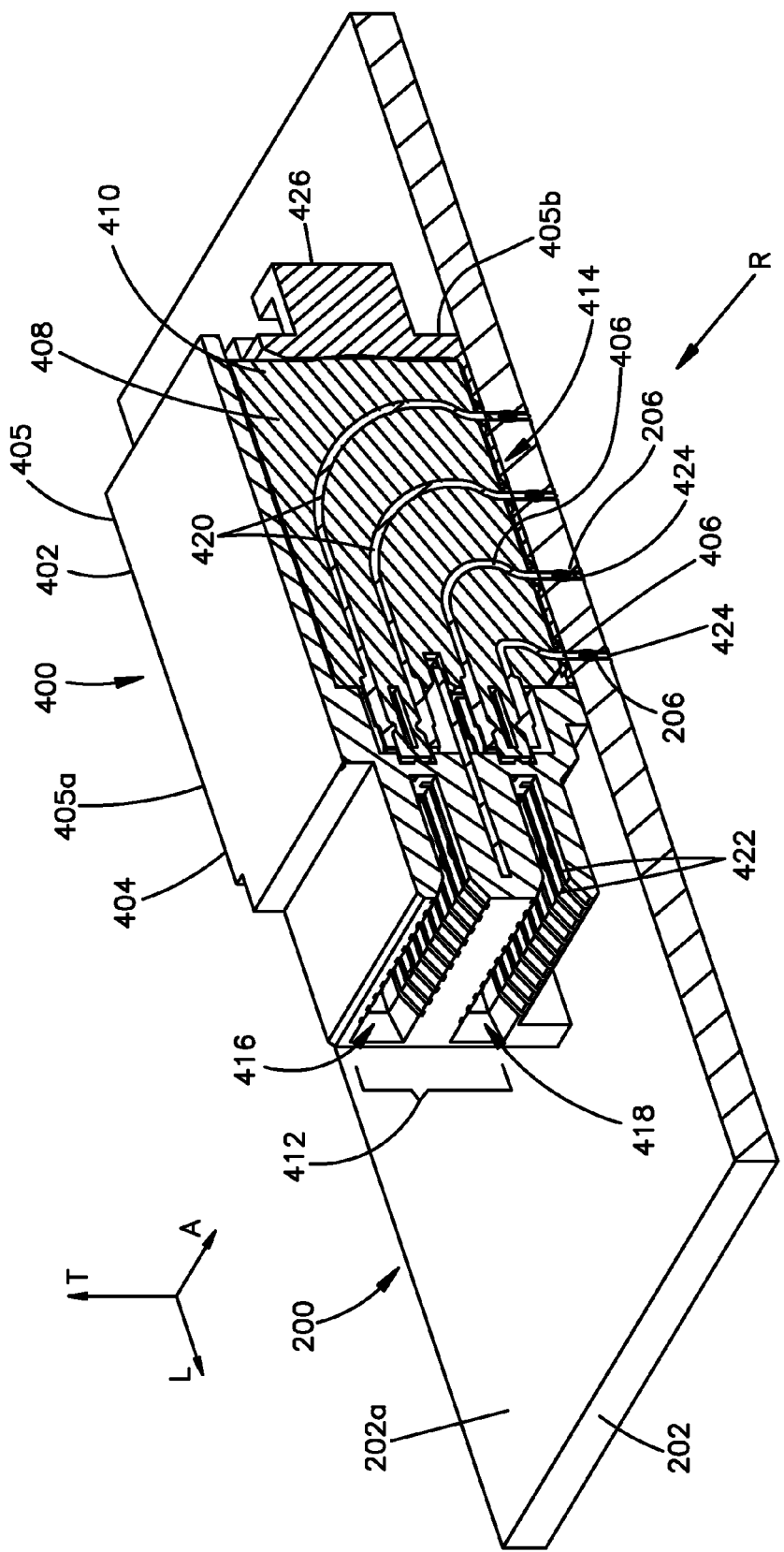
FIG. 4 is a perspective section view of an electrical connector component of the electrical assembly illustrated in FIGS. 1A-B.
Figure 6A:
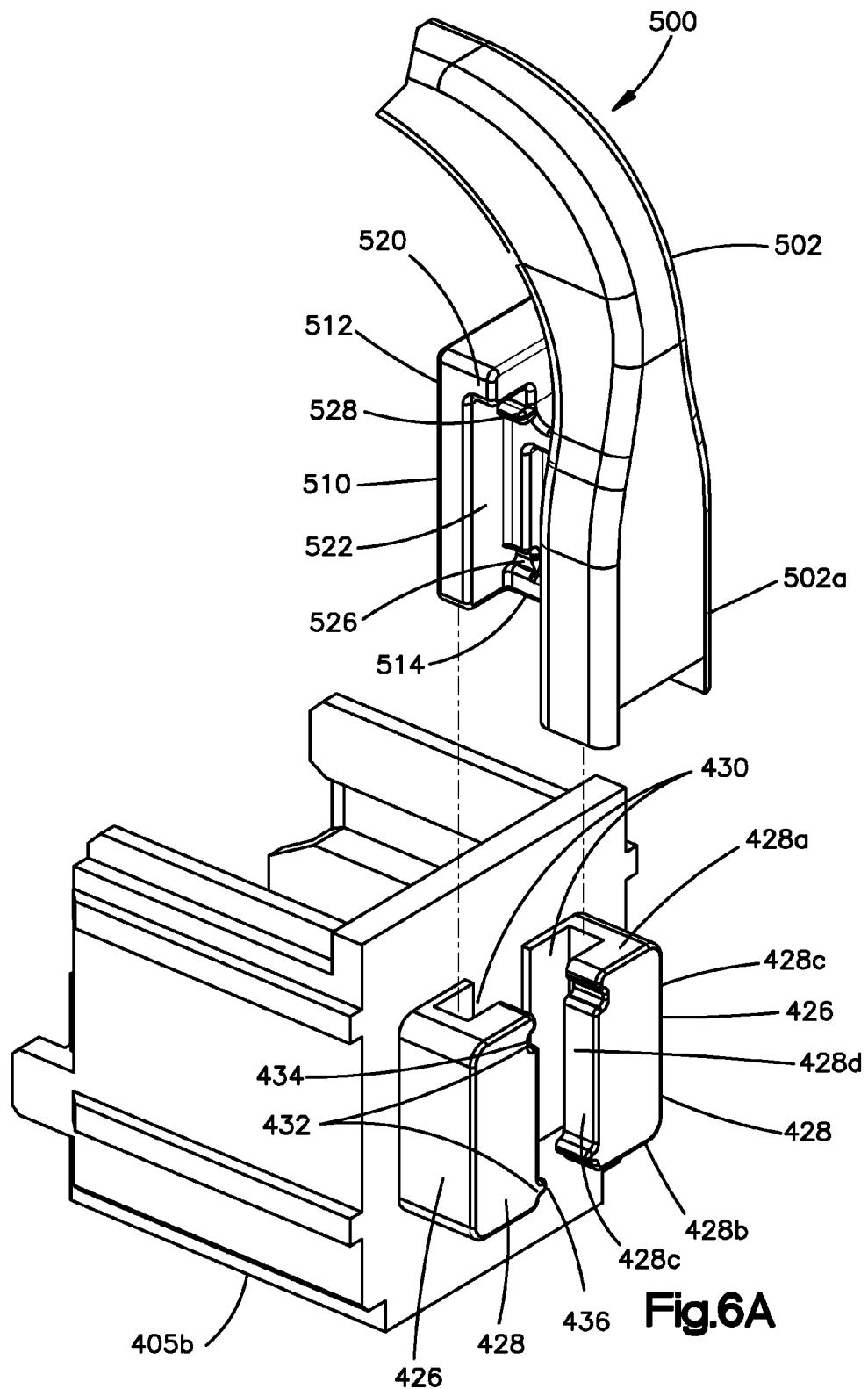
FIG. 6A is a perspective view of the portion of the light pipe illustrated in FIG. 5A and a rear portion of an electrical connector housing such as those illustrated in FIG. 4, the rear portion of the electrical connector housing configured to couple to the proximal end of the light pipe.
Figure 9A:
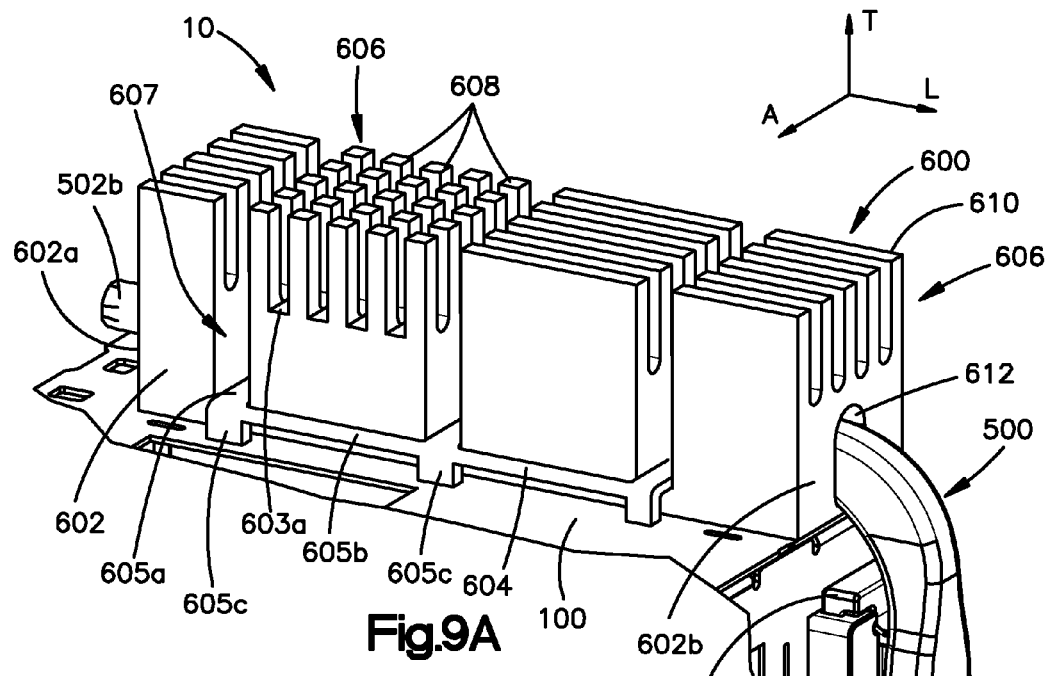
FIG. 9A is a perspective view of the light pipe component inserted into a heat sink component of the electrical assembly illustrated in FIGS. 1A-B, in accordance with an embodiment.
Figure 9B:
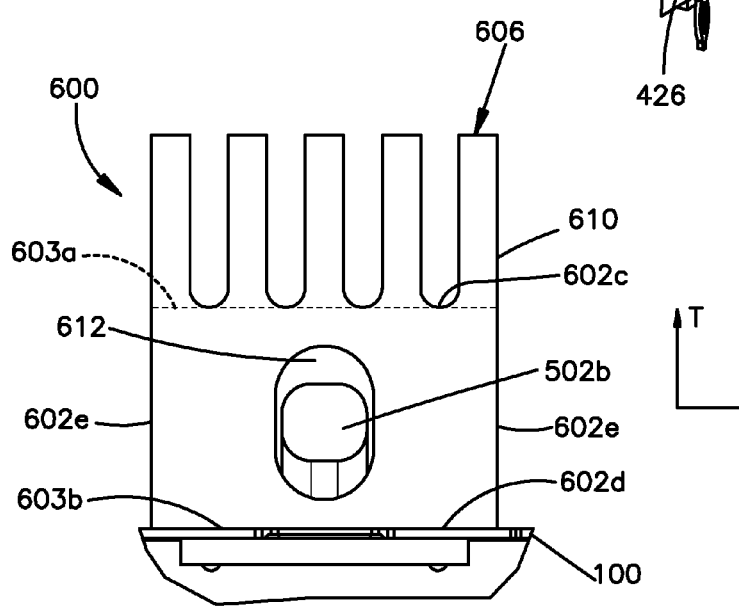
FIG. 9B is a front elevation view of the light pipe inserted into the heat sink illustrated in FIG. 9A.

Referring now to FIGS. 3B-4, each of the plurality of electrical connectors 400 include a respective connector housing 402 and a plurality of electrical contacts 406 that are supported by the connector housing 402. The electrical contacts 406 of the plurality of electrical contacts 406 can be mate with an electrical component, such as the second electrical component 300, thereby placing the second electrical component 300 into electrical communication with the substrate 200. For instance, each electrical connector 400 can include at least one, such as a plurality of leadframe assemblies 408 supported by the connector housing 402. Each leadframe assembly 408 can include a dielectric or electrically insulative leadframe housing 410 that carries respective contacts 406 of the plurality of the electrical contacts 406. The leadframe assemblies 408 can be configured as insert molded leadframe assemblies (IMLAs) whereby the respective leadframe housings 410 are overmolded onto respective electrical contacts 406 of the plurality of electrical contacts 406. Alternatively, the respective electrical contacts 406 of the plurality of electrical contacts 406 can be stitched into the leadframe housing 410 or otherwise supported by the leadframe housing 410. The connector housings 402 can be constructed of any suitable dielectric and/or insulative material as desired.

Each connector housing 402 can define a mating interface 412 configured to electrically connect to a respective second electrical component 300 and a mounting interface 414 that is configured to be mounted to the substrate 200. The mating interface 412 can include first and second receptacle pockets 416 and 418, respectively, defined by the connector housing 102, the first and second receptacle pockets 416 and 418 spaced apart from each other along the transverse direction T, such that the first receptacle pocket 416 can be positioned as an upper receptacle pocket, and the second receptacle pocket 418 can be positioned as a lower receptacle pocket. Each electrical contact 406 of the plurality of electrical contacts can include a contact body 420 that extends between a mating end 422 and an opposed mounting end 424. The mating ends 422 can be disposed proximate the mating interface 412, and can be configured to mate with complimentary mating ends of respective electrical contacts of a second electrical component 300, thus placing the second electrical component 300 into electrical communication with the substrate 200 via the respective electrical connector 400. For instance, the mating ends 422 can be constructed as receptacle mating ends configured to receive mating ends of the second electrical component 300, such as blade type mating ends, contact pads affixed to one or more surfaces of a card, and the like. The mounting ends 424 can be disposed proximate the mounting interface 414, and can be configured to be mounted to an underlying substrate 200, such as printed circuit board 202, for example by pressing the mounting ends 422 into respective plated through-holes 206 that extend into the printed circuit board 202.

In accordance with the illustrated embodiment, each connector housing 402 can include a body 404 that can define any suitable shape as desired, such as rectangular. The body 404 can define a front end 404a, and an opposed rear end 404b that is spaced from the front end 404a along the longitudinal direction L, opposed sides 404c and 404d spaced along the lateral direction A, an upper end 404e and an opposed lower end 404f spaced from the upper end 404e along the transverse direction T. The mating interface 412 can be defined by the front end 404a of the connector housing 402, and the mounting interface 414 can be defined by the lower end 404f. In this regard, it should be appreciated that the illustrated electrical connector 400 is configured as a right-angle connector whereby the mating and mounting interfaces 412 and 414 extend substantially perpendicular to each other, though the electrical connector 400 can alternatively be configured as a vertical connector whereby the mating and mounting interfaces 412 and 414 extend substantially parallel to each other.

In accordance with one embodiment, the body 404 can be a two-part body 405 that includes a first, or forward, body portion 405a that defines at least a portion of, for instance an entirety of, the front end 404a of the body 404, and a second or rear body portion 405b that defines at least a portion of, for instance an entirety of, the rear end 404b. The two-part body 405 can be constructed in any manner as desired. In accordance with the illustrated embodiment, the forward body portion 405a of each electrical connector 400 supports respective electrical contacts 406 of the plurality of electrical contacts 406, and the rear body portion 405b is configured to attach to the main body portion 405a. For instance, the rear body portion 405b is configured to be received by the main body portion 405a in one embodiment. It should be appreciated that the electrical connector housings 402 are not limited to the illustrated two part housing bodies 405, and that the connector housings 402 can alternatively constructed as desired, for instance with a one piece housing body.

At least one, such as all of the connector housings 402 can include a retainer 426 that extends outwardly from the housing body 404. The retainer 426 can be configured to directly secure to a respective light pipe 500. For example, in accordance with the illustrated embodiment, the retainer 426 can be configured to secure directly to, and thus retain, at least one attachment member 510 of a respective one of the light pipes 500. The retainer 426 can extend from, and thus be supported by, the rear end 404b of the housing body 404. In accordance with the illustrated embodiment, the retainer 426 extends from the rear end 404b of the housing body 404, and in particular extends rearward from the rear body portion 405b. Therefore, it can be said that each connector housing 402 can include a retainer 426 supported by the housing body 404 of the respective connector housing 402. The retainers 426 can be integral with the connector housing 402 or separate from and carried by the connector housing 402. The retainers 426 are configured to attach to the light pipes 500 such that the light pipes 500 are directly supported by the connector housing 402, for instance by the rear end 404b of the housing body 404. The retainers 426 can be constructed so as to extend longitudinally through the rear end 102b of the guide frame body 102, for instance through the rear wall 102c, as described in more detail below.

Figure 2A:
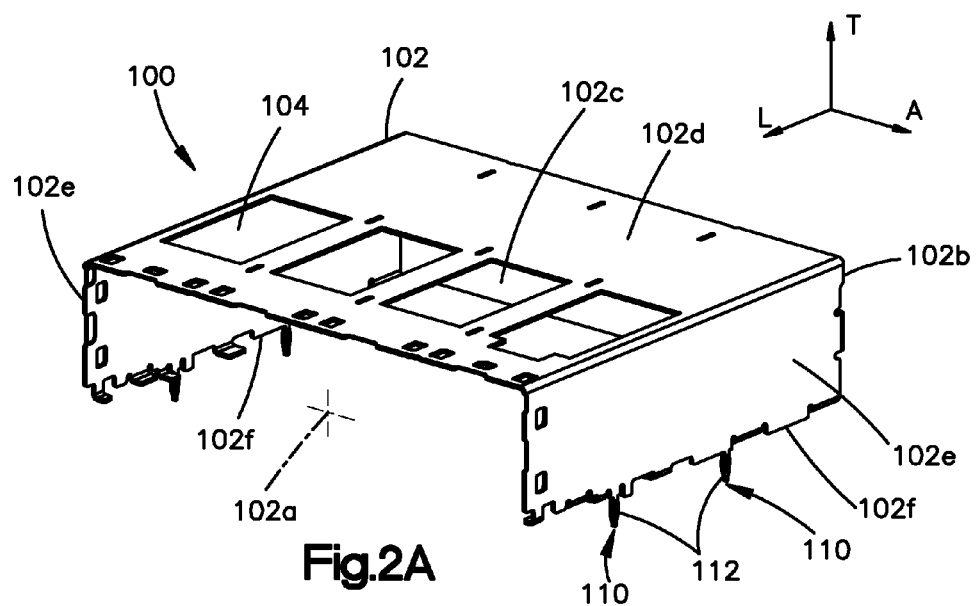
FIG. 2A is a perspective view of a guide frame component of the electrical assembly illustrated in FIGS. 1A-B.

Referring generally now to FIGS. 2A-C, the rear wall 102c of the guide frame body 102 can be configured to receive at least a portion of each of the plurality of connector housings 402, such as the retainer 426 of each of the plurality of connector housings 402. For instance, the retainer 426 of each of the plurality of connector housings 402 can extend though a respective opening defined in the closed end 102b of the guide frame body 102.

Referring now to FIG. 2B, in accordance with an embodiment, the closed end 102b of the guide frame body 102, and in particular the rear wall 102c can define a plurality of openings 114 that extend through the rear wall 102c. Each of the openings 114 can be configured to receive a corresponding portion of a respective one of the retainers 426. For example, in accordance with the illustrated embodiment, the rear wall 102c can define at least one pair of openings 114, each opening 114 of the at least one pair of each opening 114 configured to receive a respective retainer body 428 of a respective retainer 426 (see FIGS. 6A-B and 8A-B). Each pair of openings 114 can be defined such that the openings 114 align with respective retainer bodies 428 of a retainer 426. The pairs of openings 114 can be spaced laterally from each other across the rear wall 102c. During assembly of the electrical assembly 10, the retainers 426 of each of the plurality of connector housings 402 can be inserted into respective ones of the pairs of openings 114 before the guide frame 100 is mounted to the substrate 200, such that the connector housings 402 and the guide frame 100 are mounted to the substrate 200 substantially concurrently. The openings 114 can be sized to receive the retainers 426 within the openings 114 in press fit engagement, such that when a retainer 426 extends through a respective pair of openings 114 in the rear wall 102c of the guide frame body 102, the connector housing 402 supporting the retainer 426 can be coupled to the closed end 102b of the guide frame body 102. Alternatively, the openings 114 can be sized such that the retainers 426 are received in the openings 114 in a clearance fit.

Referring now to FIG. 2C, in accordance with an alternative embodiment, the rear wall 102c can define a plurality of openings in the form of slots 116 that extend transversely upward into the rear wall 102c from the bottom edge 102f. The slots 116 can be defined in pairs, such that each pair of slots 116 aligns with a retainer 426 of a respective one of the plurality of connector housings 402, and each slot 116 of each pair of slots 116 aligns with a respective retainer body 428 of a respective retainer 426. The pairs of slots 116 can be spaced laterally from each other across the rear wall 102c. During assembly of the electrical assembly 10, the connector housings 402 of the electrical assembly 10 can be mounted to the substrate before the guide frame 100 is mounted to the substrate 200, for instance utilizing a reflow process. When the guide frame 100 is subsequently mounted to the substrate 200, the slots 116 of the rear wall 102c can fit over the retainers 426 of each of the plurality of connector housings 402 as the guide frame 100 is mounted to the substrate 200. In accordance with the illustrated embodiment, the slots 116 can define a tab 118 that extends downward between the slots 116. The tab 118 can extend downward a distance defined by its proximal and distal ends 118a, 118b such that the distal end 118b of the tab 118 is substantially aligned with the bottom edge 102f of the rear wall 102c. The tab 118 can operate to shield the connector housing 402 from electrical interference generated by a proximate light emitting element 204, such as and LED 205. The slots 116 can be sized to receive the retainers 426 within the slots 116 in press fit engagement, such that when a retainer 426 extends through a respective pair of slots 116 in the rear wall 102c of the guide frame body 102, the connector housing 402 supporting the retainer 426 can be coupled to the closed end 102b of the guide frame body 102. Alternatively, the slots 116 can be sized such that the retainers 426 are received in the slots 116 in a clearance fit.

Referring again to FIGS. 1A-B, the retainers 426 can be configured to receive respective complimentary attachment members 510 of the plurality of light pipes 500, such that the light pipes 500 are directly coupled to and/or supported by the connector housings 402. A plurality of heat sinks 600 can be coupled to the guide frame 100. Each heat sink 600 of the plurality can be configured such that at least a portion of a respective one of the plurality of light pipes 500 can be disposed therein, for example such that the at least a portion of the respective one of the light pipes 500 is surrounded by the heat sink 600. The plurality of light pipes 500 can be configured to be disposed into the heat sinks 600 and coupled to the retainers 426 of the connector housings 402 such that proximal ends 502a of the light pipes 500 (see FIGS. 5-15) at least partially enclose respective light emitting elements 204 electrically connected to the substrate 200, for instance light emitting diodes (LEDs) 205 mounted to the printed circuit board 202. When light is emitted from one of the light emitting elements 204, such as an LED 205, the proximal end 502a of the light pipe 500 can receive light from the light emitting element 204. The light can be transmitted along the body 502 of the light pipe 500 from the light emitting element 204 to the distal end 502b of the light pipe 500, where the light can be viewed as visible light. The apertures 704 can be configured to receive the distal ends 502b of respective ones of the plurality of light pipes 500.

Referring generally to FIGS. 6A-C and 8A-C, the retainer 426 of each connector housing 402 can include a pair of laterally spaced retainer bodies 428 that are spaced from each other along the lateral direction A, and can be constructed as mirror images of one another. The retainer bodies 428 can be spaced from one another such that the neck 514 of a complementary attachment member 510 of a light pipe 500 can be received between the retainer bodies 428. In accordance with the illustrated embodiments, each retainer body 428 defines an upper end 428a, a transversely opposed lower end 428b, and laterally opposed sides 428c. Each retainer body 428 can define an inner, or facing, surface 428d on the side 428c of the body 428 that faces the other of the retainer bodies 428. Therefore, each retainer 426 can be said to define a pair of inner, or facing surfaces 428d that face one another and are spaced from one another along the lateral direction A. Each retainer body 428 can define a channel 430 that extends into the inner surface 428d from the upper to the lower ends 428a, 428b, such that each retainer 426 defines a pair of channels 430, the channels sized to receive wings 522 supported by the attachment member body 512 of a respective light pipe 500, as described in more detail below. Each retainer body 410 can define at least one engagement member 432, the at least one engagement member 432 configured to engage with a complementary engagement member 524 supported by the attachment member 510 of a respective light pipe 500 so as to secure the light pipe 500 in an attached, or coupled position relative to the connector housing 402.

Referring generally now to FIGS. 5A-15, the illustrated light pipes 500 define generally cylindrical, square, rectangular, or otherwise shaped light pipe bodies 502 that extend between respective proximal ends 502a disposed proximate the substrate 200, for instance the upper surface 202a of the printed circuit board 202, and opposed distal ends 502b that can be disposed proximate the front end 102a of the guide frame 100. The light pipes 500 can be constructed of plastic, or any other suitable material as desired. The body 502 of each light pipe 500 can define an optical conduit that is configured to transmit light between the proximal and distal ends 502a, 502b, respectively. For instance, light emitted from one or the light emitting elements 204 can be received by the proximal end 502a of the light pipe 500 and communicated along the light pipe body 502 to the distal end 502b, and emitted from the distal end 502b as visible light. The proximal end 502a of each light pipe 500 can be configured to capture light emitted from a respective light emitting element 204. For instance, in accordance with the illustrated embodiments, a cross-sectional dimension, for instance the diameter, of the body 502 of each light pipe 500 can flare out proximate the proximal ends 502a, for example along the lateral direction A, such that the proximal end 502a of each light pipe 500 at least partially encloses a respective light emitting element 204, such as an LED 205, or can be positioned adjacent to a respective light emitting element 204, such that light emitted from the respective light emitting element 204 is transmitted along (e.g., through) the body 502 of the light pipe 500 and is viewable at the distal end 502b thereof.

In accordance with the illustrated embodiments, the body 502 of each light pipe 500 can define a body geometry comprising a number of sections. For instance, the body 502 of each light pipe 500 can define a first, distal section 504 that is substantially straight and extends along, and thus can be said to be oriented along, a first direction that is substantially parallel to the insertion direction I and the insertion direction L, a second, proximal section 506 that is substantially straight and extends along, and thus can be said to be oriented along, a second direction that is angularly offset relative to the first direction, and can extend substantially parallel to the transverse direction T, and a third, curved section 508 that is disposed between the distal and proximal sections 504, 506, respectively. The illustrated curved section 508 comprises a bend of approximately ninety degrees in the body 502 of the light pipe 500, and can be referred to as a transition between the distal and proximal sections 504, 506. It should be appreciated that the light pipes 500 that can be utilized with the electrical assembly 10 are not limited to the illustrated light pipe body geometries, and that one or more of the light pipes 500 can alternatively be configured to define any other suitable light pipe body geometry as desired.

At least one, such as a plurality of light pipes 500 can be coupled to respective ones of the connector housings 402, such that each light pipe 500 is directly supported by a housing body 404 of a respective one of the connector housings 402. For instance, at least a portion of the light pipe 500, for instance an attachment member 510 of the light pipe 500 that extends, directly or indirectly, from the body 502 of the light pipe 500 is in physical contact with at least a portion of a respective one of the connector housings 402, such as the retainer 426 that extends from the housing body 404 of a respective one of the connector housings 402.

The proximal end 502a of the body 502 of each light pipe 500 can support, or carry, an attachment member 510, the attachment member 510 configured to be received in the retainer 426 of a respective connector housing 402. In accordance with the illustrated embodiments, each attachment member 510 can comprise a generally rectangular shaped attachment member body 512 having an upper end 512a, a transversely opposed lower end 512b, and laterally opposed sides 512c. The body 512 can be connected to the proximal end 502a of a respective light pipe 500 by a neck 514 that extends from an inner, or guide frame 100 facing, surface of the proximal end 502a of the light pipe 500. The neck 514 can define a width along the lateral direction A that is narrower than that of the body 512, and can comprise horizontally oriented upper and lower beams 516 spaced apart along the transverse direction T, and a vertically oriented intermediate beam 518 that extends between the upper and lower beams 516, such that the neck 514 defines a substantially "I" shaped cross sectional geometry relative to a plane defined by the lateral and transverse directions. Alternatively, the intermediate beam 518 can be omitted, such that the neck 514 comprises the upper and lower beams 516, as depicted in FIG. 5C. The attachment member body 512 can define a stop member 520 at the upper end 512a thereof, and a pair of wings 522 that extend downward from the stop member 520 and outwardly from respective sides of the neck 514. The stop member 520 can be configured to contact the upper ends 428a of the retainer bodies 428 of a respective retainer 426 into which the attachment member 510 is inserted when the light pipe 500 reaches its fully inserted position relative to the connector housing 402. The illustrated stop members 520 define a thickness along the longitudinal direction L that is greater than that of the wings 522. The wings 522 can be configured to be received in respective channels 430 defined by the retainers 426 of the connector housings 402, as described in more detail below. Each attachment member 510 can define at least one engagement member 524, the engagement member 524 configured to engage with complementary engagement members 432 defined by a corresponding retainer 426 so as to secure the light pipe 500 in a coupled position relative to a respective connector housing 402.

Referring now to FIGS. 5A-6C, in accordance with an embodiment, the retainer 426 can define engagement members 432 in the form of a pair of grooves 434 that extend into the respective inner surfaces 428d of the retainer bodies 428 and a pair of ribs 436 that extend out from the respective inner surfaces 428d of the retainer bodies 428. The pairs of grooves 434 and ribs 436 can be substantially aligned relative to each other along the transverse direction T. The attachment member 510 can define engagement members 524 in the form of a pair of grooves 526 that extend out from opposed sides of the neck 514, the grooves 526 configured to receive the ribs 436 of the retainer 426, and a pair of ribs 528 that extend into opposed side of the neck 514, the ribs 528 configured to be received in the grooves 434 of the retainer 426. The pairs of grooves 526 and ribs 528 can be substantially aligned relative to each other along the transverse direction T.

In accordance with the illustrated embodiment, a light pipe 500 can be coupled to a respective connector housing 402 by inserting the attachment member 510 into the retainer 426, for example by inserting the wings 522 into respective ones of the channels 430 and advancing the attachment member 510 downward relative to the retainer 426 along the transverse direction T. As the attachment member 510 of a light pipe 500 is inserted into a retainer 426 of a respective connector housing 402, the ribs 528 will come to rest in the grooves 434, and the ribs 436 will come to rest in the grooves 526 when the attachment member 510 is fully inserted relative to the retainer 426 (see FIGS. 6B-C). The attachment member 510 and the retainer 426 can be configured such that engagement between the ribs 528 and the grooves 434 can occur concurrently or separately from engagement between the ribs 436 and the grooves 526. Additionally, with the attachment member 510 in a fully inserted position relative to the retainer 426, the stop member 520 can come to rest against the upper ends 428a of the retainer bodies 428, for instance to prevent over insertion of the attachment member 510 into the retainer 426, and the proximal end 502a of the light pipe 500 can at least partially enclose, or be disposed adjacent to, a respective light emitting element 204, such as an LED 205 of the printed circuit board 202.

Referring now to FIGS. 7-8C, in accordance with an alternative embodiment, the retainer 426 can define engagement members 432 in the form of a pair of opposed latch arms 438, each retainer body 428 supporting a respective one of the pair of latch arms 438. The latch arms 438 can be configured to be resiliently deflectable away from each other and inward relative to the respective inner surfaces 428d of the retainer bodies 428. Each latch arm 438 can define a respective latch element 440 at a distal end thereof. The attachment member 510 can define complementary engagement members 524 in the form of a pair of generally triangular shaped wings 530 that extend out from opposed sides of the neck 514, each wings 530 configured to engage a respective latch element 440.

In accordance with the illustrated embodiment, a light pipe 500 can be coupled to a respective connector housing 402 by inserting the attachment member 510 into the retainer 426, for example by inserting the wings 522 into respective ones of the channels 430 and advancing the attachment member 510 downward relative to the retainer 426 along the transverse direction T. As the attachment member 510 of a light pipe 500 is inserted into a retainer 426 of a respective connector housing 402, leading surfaces 532 defined by the wings 530 will engage respective complementary leading surfaces 442 of the latch elements 440, thereby causing the latch arms 438 to be deflected away from each other. When the attachment member 510 is advanced into a fully inserted position relative to the retainer 426 (see FIGS. 8B-C), the wings 530 will pass the latch elements 440, thereby allowing the latch arms 438 to snap back to their non-deflected states. With the latch arms 438 snapped back to their non-deflected positions, trailing surfaces 534 defined by the wings 530 can abut respective complementary trailing surfaces 428 of the latch elements 440, thereby securing the attachment member 510 in the inserted position relative to the retainer 426. Additionally, with the attachment member 510 in a fully inserted position relative to the retainer 426, the stop member 520 can come to rest against the upper ends 428a of the retainer bodies 428, for instance to prevent over insertion of the attachment member 510 into the retainer 426, and the proximal end 502a of the light pipe 500 can at least partially enclose, or be disposed adjacent to, a respective light emitting element 204, such as an LED 205 of the printed circuit board 202.

It should be appreciated that the retainer 426 and the attachment member 510 are not limited to the illustrated engagement members 432, 524, respectively, and that the retainer 426 and/or the attachment member 510 can alternatively be constructed with any other suitable attachment members as desired. For instance, the attachment member 510 can alternatively be configured to receive the retainer 426, the attachment member 510 can alternatively be constructed so as to extend longitudinally through the rear end 102b of the guide frame body 102, and so on. It should further be appreciated that the retainer 426, while illustrated and described herein as extending from the electrical connector housing 402, could be supported by any other component of the electrical assembly 10 as appropriate, such as the guide frame 100.

Referring now to FIGS. 9A-11B, the electrical assembly 10 can include at least one, such as a plurality of heat sinks 600. Each heat sink 600 can have a heat sink body 602 that can be defined having any suitable shape as desired, such as rectangular. In accordance with the illustrated embodiment, each heat sink body 602 defines a front end 602a, an opposed rear end 602b that is spaced from the front end 602a along the longitudinal direction L, an upper or outer end 602c, a lower or inner end 602d that is spaced from the upper end 602c along the transverse direction T that can be configured to be mounted to the guideframe 100, and opposed first and second sides 602e that are spaced from each other along the lateral direction A. The upper end 602c of the heat sink body 602 can define an upper or outer surface 603a, and the lower end 602d of the heat sink body 602 can define a lower or inner surface 603b.

The heat sink 600 can be mounted to the guide frame 100 such that the front end 602a of the heat sink body 602 is disposed proximate the front end 102a of the guide frame body 102, and the rear end 602b of the heat sink body 602 is disposed proximate, such as at the rear end 102b of the guide frame body 102. For instance, in accordance with the illustrated embodiment the heat sink 600 can be mounted to the upper wall 102d of the guide frame body 102 and secured in a mounted position relative to the guide frame 100 using a bracket 604 that is configured to attach to the guide frame body 102. The illustrated bracket 604 includes a plurality of straps 605a that extend along the lateral direction A, the straps 605a connecting laterally opposed sides 605b of the bracket 604, the straps 605a configured to be received in corresponding grooves 607 defined by the heat sink body 602 that extend into the upper surface 603a and into the heat sink body 602 along the transverse direction T. The illustrated bracket 604 further includes a plurality of legs 605c that extend downward along the transverse direction T from each side 605b of the bracket 604, the legs 605c having distal ends that are configured to be received in corresponding openings defined in the upper wall 102d of the guide frame body 102, the distal ends of the legs 605c configured to engage the upper wall 102d of the guide frame body 102 when the bracket 604 is attached to the guide frame 100.

The bracket 604 can be configured to mount the heat sink 600 to the guide frame body 102 in a spring-loaded fashion, such that the heat sink 600 can be resiliently biased inward or outward relative to the guide frame 100 along the transverse direction T. For instance, when a second electrical component 300 is inserted into the guide frame 100, respective portions of the bracket 604, such as the straps 605a, can exert forces on respective portions of the heat sink body 602 that cause the heat sink body 602 to be biased inward toward a respective surface of the second electrical component 300 such that at least a portion of the lower surface 603b of the heat sink body 602 makes contact with a corresponding portion of the respective surface of the second electrical component 300. Heat generated by the second electrical component 300 can be conductively transferred into the body 602 of the heat sink 600 and dissipated from the heat sink 600, for instance via the cooling members 606 described in more detail below, thereby effecting cooling of the second electrical component 300 via the respective heat sink 600.

The heat sink 600 can include at least one, such as a plurality of cooling members 606 that extend from, or are supported by, the heat sink body 602, the cooling members configured to dissipate heat generated within the at least one cavity 106 of the guide frame 100, for example heat generated by the second electrical component 300 and conducted to the heat sink 600. In accordance with the illustrated embodiment, a plurality of cooling members 606 extend outward along the transverse direction T from the upper surface 603a of the heat sink body 602, but it should be appreciated that cooling members 606 can extend from any portion of the heat sink body 602, along any direction relative to the heat sink body 602, as desired. The cooling members 606 can define any suitable geometry or structure as desired. For example, in accordance with the illustrated embodiment, the cooling members 606 comprise cooling posts 608 and cooling fins 610. The cooling members 606 can be spaced from one another and arranged in rows that extend substantially parallel to the longitudinal direction L, and/or columns that extend substantially parallel to the lateral direction A. For example, in accordance with the illustrated embodiment, the heat sink 600 comprises three pluralities of cooling fins 610 arranged in rows, and a plurality of cooling posts 608 arranged in an array comprising rows and columns. The illustrated cooling members 606 extend upward along the transverse direction T from at least one upper surface of the heat sink body 602, but can alternatively extend from the heat sink body 602 along any other suitable direction as desired. It should be appreciated that the heat sink 600 is not limited to the illustrated arrangements of cooling members 606, and that at least one, such as a plurality of heat sinks 600 can alternatively be constructed using any suitable cooling members 606 as desired.

The heat sink body 602 can be configured to receive at least a portion of a respective light pipe 500. For example, in accordance with an embodiment, the heat sink body 602 can define a bore 612 that extends through the heat sink body 602, for instance from the front end 602a through the rear end 602b, the bore 612 sized such to receive at least a portion of a respective light pipe 500, for instance the distal section 504, therein in a clearance fit, such that the at least a portion of the light pipe 500 extends through the bore 612. The distal end 502b of the light pipe 500 can protrude beyond the front end 602a of the heat sink 600 when the light pipe is disposed in the bore 612.

The bore 612 can be defined inward from the upper surface 603a of the heat sink body 602, such as between the upper and lower surfaces 603a-b of the heat sink body 602, and between the first and second sides 602e, such that the at least a portion a respective light pipe 500 that is received therein can be said to be at least partially, such as fully enclosed by the bore 612 and more generally by the heat sink body 602. Alternatively, the heat sink body 602 can define at least one, such as a plurality of openings that connect the bore 612, such as an inner surface of the bore 612, with a respective outer portion of the heat sink body 602, such as at least one of the upper end 602c, the lower end 602d, or the first or second sides 602e, or any combination thereof, as desired. The bore 612 can be sized such that the light pipe 500 "floats" in the bore 612, for instance such that the light pipe body 502 does not make contact with the inner surface of the bore 612. When the at least a portion of the light pipe 500, for instance the distal section 504 thereof, is disposed in the bore 612 it can be said that the bore 612, and thus the heat sink body 602, or more generally the heat sink 600, at least partially, such as completely, surrounds the at least a portion of the light pipe 500.

Figure 10A:
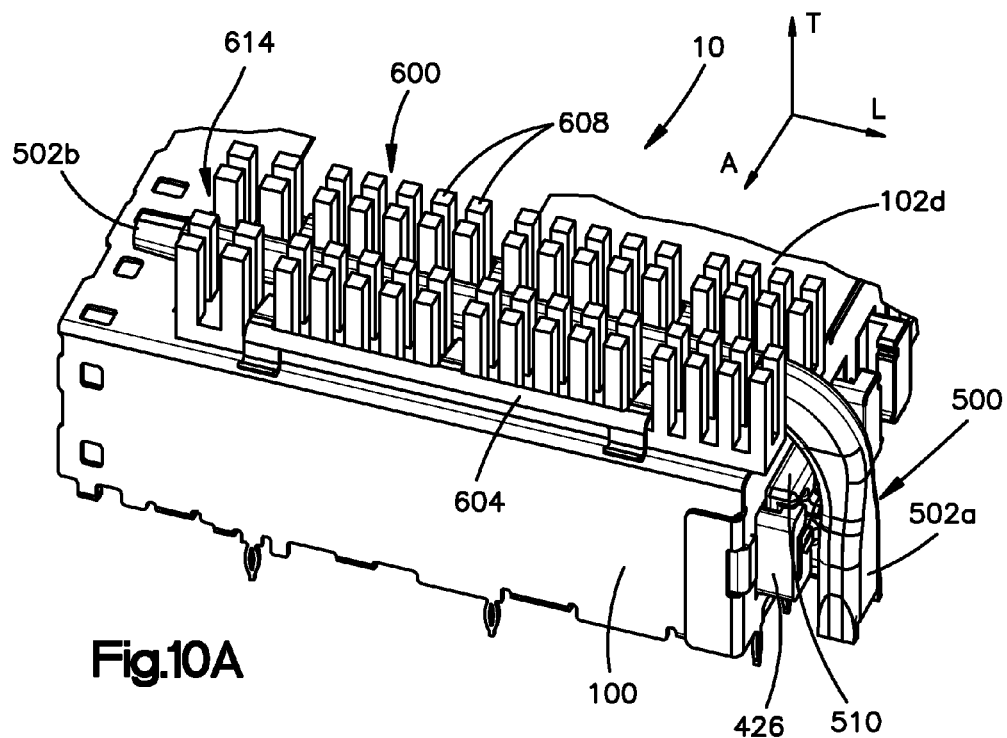
FIG. 10A is a perspective view of a portion of an electrical assembly, wherein the heat sink component is constructed in accordance with an alternative embodiment.
Figure 10B:
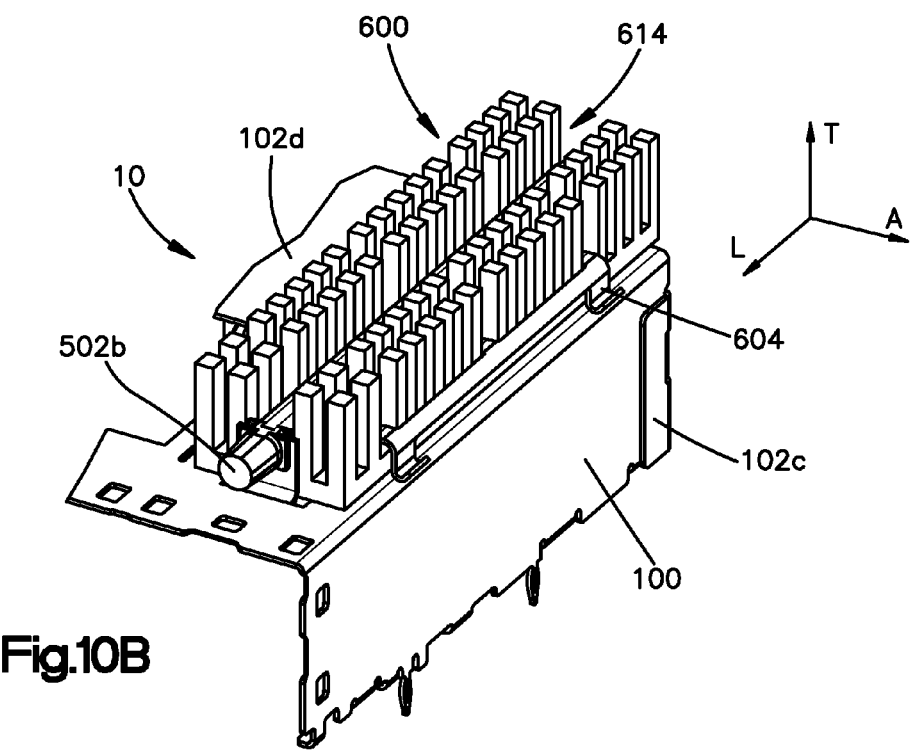
FIG. 10B is a perspective view of the portion of the electrical assembly illustrated in FIG. 10A.

Referring now to FIGS. 10A-B, the guide frame 100 can be configured to at least partially support the light pipe 500. For example, the guide frame 100 can define a light pipe support member 120 configured to receive at least a portion of the light pipe 500, such as the distal end 502b thereof. In accordance with the illustrated embodiment, the upper wall 102d of the guide frame 100 can define a tab 122 comprising a notch 124 sized to receive the distal end 502b of a respective light pipe 500. The tab can be integral with the body 102 of the guide frame 100, for example defined during a stamping process and bent into position. Alternatively, the tab 122 can be separately constructed and attached to the body 102 of the guide frame 100. The illustrated tab 122 is disposed near the front end 102a of the guide frame 100 along the front most inner surface of a respective one of the openings 104, but could be located anywhere else on the body 102 of the guide frame 100 as desired. The tab 122 can also operate to align the light pipe 500 relative to the guide frame 100 and/or the heat sink 600, for example during coupling of a light pipe 500, or a heat sink 600 having at least a portion of a light pipe 500 disposed therein, to the guide frame 100. The light pipe 500 can be configured to engage with the support member 120 of the guide frame 100. For instance, in accordance with the illustrated embodiment, the distal end 502b of the light pipe 500 defines laterally opposed slots 536 defined by laterally pairs of tabs 538 that extend outwardly from the body 502 of the light pipe 500 along the lateral direction A. The slots 536 can be configured to receive respective portions of the tab 122 adjacent the notch 124 therein. It should be appreciated that the guide frame 100 is not limited to the illustrated tab 122, and that the guide frame 100 can alternatively be provided with any other suitable light pipe support member as desired.

Referring now to FIGS. 11A-B, in an accordance with an alternative embodiment, the heat sink 600 can be configured partially surround the at least a portion of the light pipe 500. For instance, the heat sink body 602 can define a channel 614 sized to receive the at least a portion of the light pipe 500, the channel 614 extending substantially parallel to the longitudinal direction L. In accordance with the illustrated embodiment, the channel 614 is defined by omitting at least a portion of the middle row of cooling posts 608, such that the channel is defined outward relative to, or above, the upper surface 603a of the heat sink body 602. It should be appreciated that the heat sink body 602 is not limited to the illustrated channel 614, and that the channel 614 can be alternatively defined by the heat sink body 602 as desired. For instance, the heat sink body 602 can alternatively be constructed such that the channel 614 extends into the upper surface 603a of the heat sink body 602. The at least a portion of the light pipe 500, such as the distal section 504 thereof, can be disposed into the channel 614 such that the heat sink 600 can be said to partially surround the at least a portion of the light pipe 500, and the light pipe can be said to be disposed above, or outwardly disposed, relative to the upper surface 603a of the heat sink body 602.

Figure 12B:
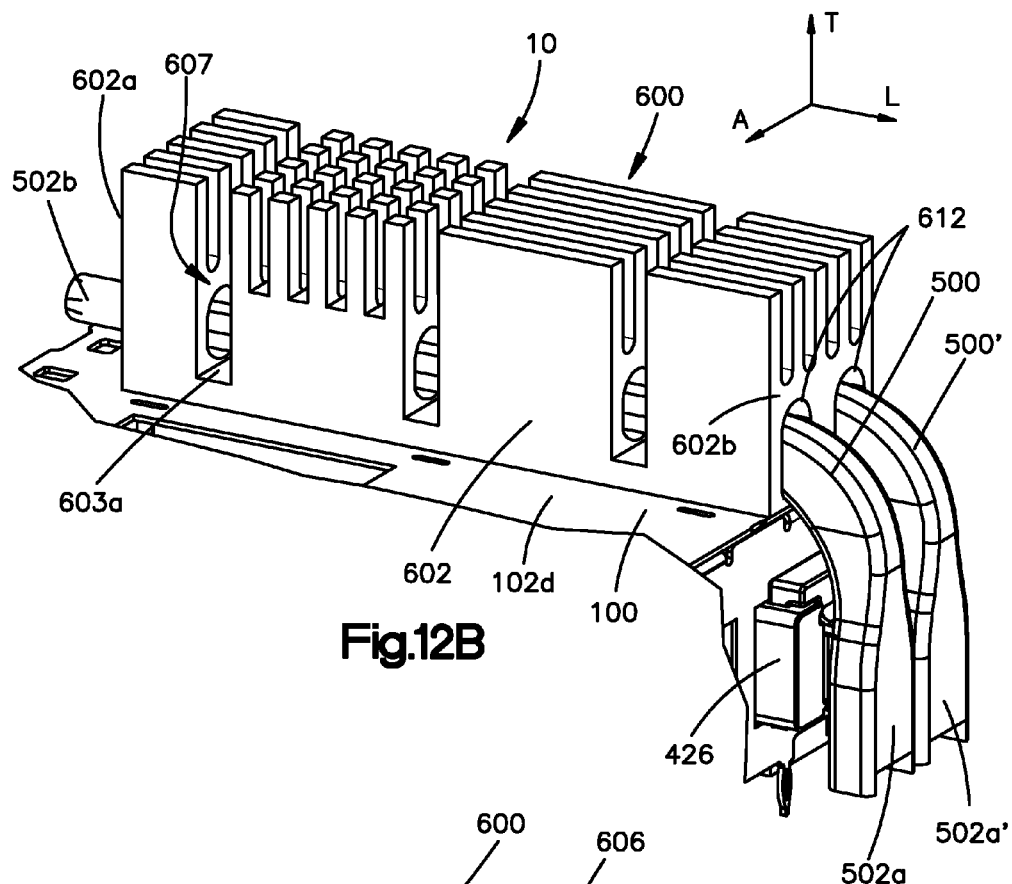
FIG. 12B is a perspective view of the light pipe illustrated in FIG. 12A, inserted into a heat sink constructed in accordance with an alternative embodiment.
Figure 12C:
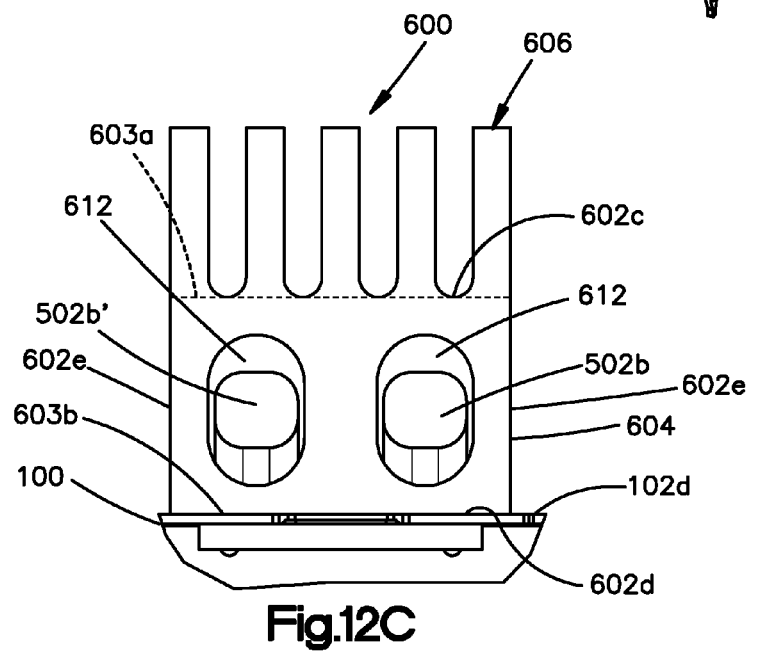
FIG. 12C is a front elevation view of the light pipe inserted into the heat sink illustrated in FIG. 12B.

Referring now to FIGS. 12A-15, two or more light pipes 500 can share a common attachment member 510, such that the two or more light pipes 500 can be simultaneously coupled to and supported by a single retainer 426 that the common attachment member 510 is inserted into. For example, FIGS. 12A-C depict a light pipe 500 and a second light pipe 500' that share a common attachment member 510. The light pipe 500 and the second light pipe 500' can be connected to one another. In accordance with the illustrated embodiment, the light pipe 500 is connected to the second light pipe 500' by a pair of beams 540 that extend between the proximal end 502a of the light pipe 500 and the proximal end 502a' of the second light pipe 500' substantially parallel to the lateral direction A. The beams 540 are connected to the common attachment member 510, such that the attachment member 510 is disposed substantially equidistantly from the respective proximal ends 502a, 502a' of the light pipe 500 and the second light pipe 500'. The illustrated common attachment member 510 has engagement members substantially identical to those illustrated in FIGS. 5A-6C, but any other suitable engagement members can be utilized as desired. The illustrated light pipe 500 and second light pipe 500' are constructed substantially identically, but could alternatively be constructed differently relative to one another, for example having light pipe bodies with different geometries, as desired.

In accordance with the illustrated embodiment, the respective proximal ends 502a, 502a' of the light pipe 500 and the second light pipe 500' are spaced from one another along a third direction that is angularly offset with respect to both the first and second directions and can extend substantially parallel to lateral direction A, and are aligned with one another along the third direction. It can therefore be said that the light pipe 500 and the second light pipe 500' are disposed in a side by side configuration relative to one another. Alternatively, the respective proximal ends 502a, 502a' of the light pipe 500 and the second light pipe 500' can be offset with respect to each other along the first direction. The proximal end 502a of the light pipe 500 can be configured to at least partially enclose a light emitting element, and the proximal end 502a' of the second light pipe 500' can be configured to at least partially enclose a second light emitting element that can be disposed adjacent to the light emitting element.

In accordance with the illustrated embodiment, a heat sink 600 can be configured to receive at least a portion of the light pipe 500 and at least a portion of the second light pipe 500'. For example, the heat sink body 602 can define a pair of bores 612 that extend through the heat sink body 602 from the front end 602a through the rear end 602b, the bores 612 sized to receive the at least a portion of the light pipe 500 and the at least a portion of the second light pipe 500' therein, respectively, in respective clearance fits. The bores 612 can be spaced from each other along the third direction, and can extend substantially parallel with respect to each other. Each of the pair of bores 612 can be sized such that each of the light pipe 500 and the second light pipe 500' float in respective ones of the bores 612. In accordance with the illustrated embodiment, the pair of bores 612 are substantially aligned relative to one another along the transverse or second direction, but alternatively can be offset relative one another along the second direction, along at least a portion, such as the entirety of the length of the bores defined by the front and rear ends 602a-b of the heat sink body 602.

Figure 13B:
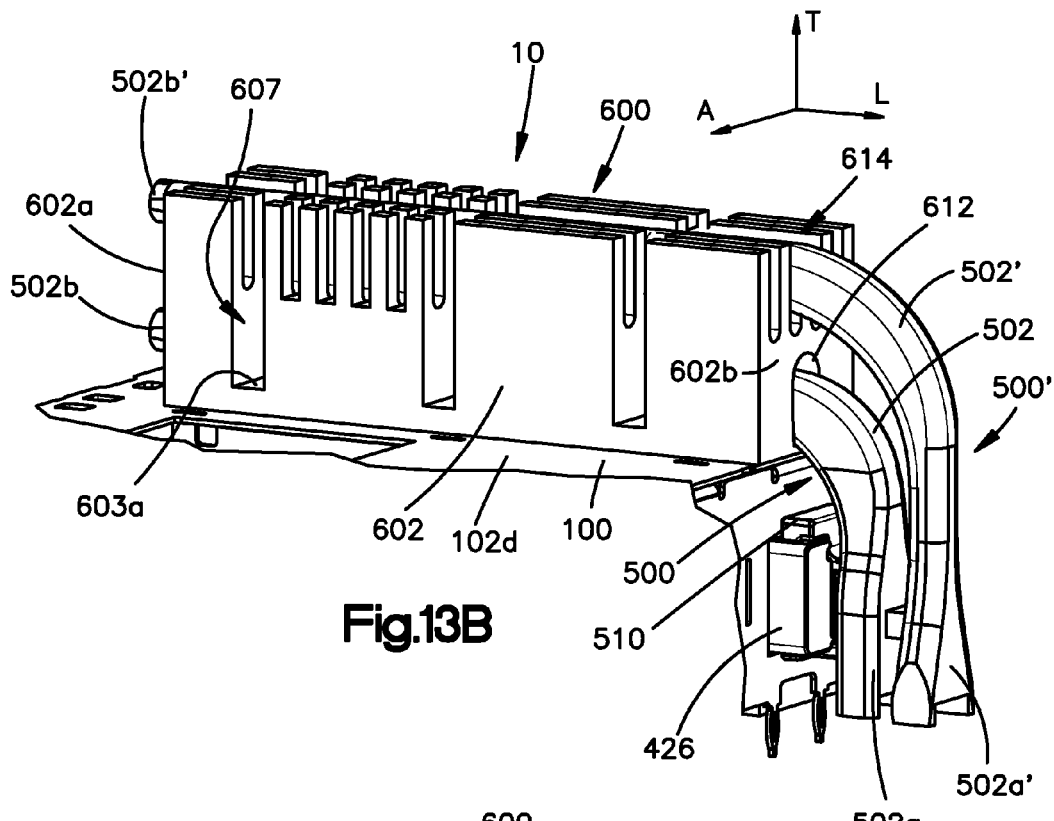
FIG. 13B is a perspective view of the light pipe illustrated in FIG. 12A, inserted into a heat sink constructed in accordance with an alternative embodiment.
Figure 13C:
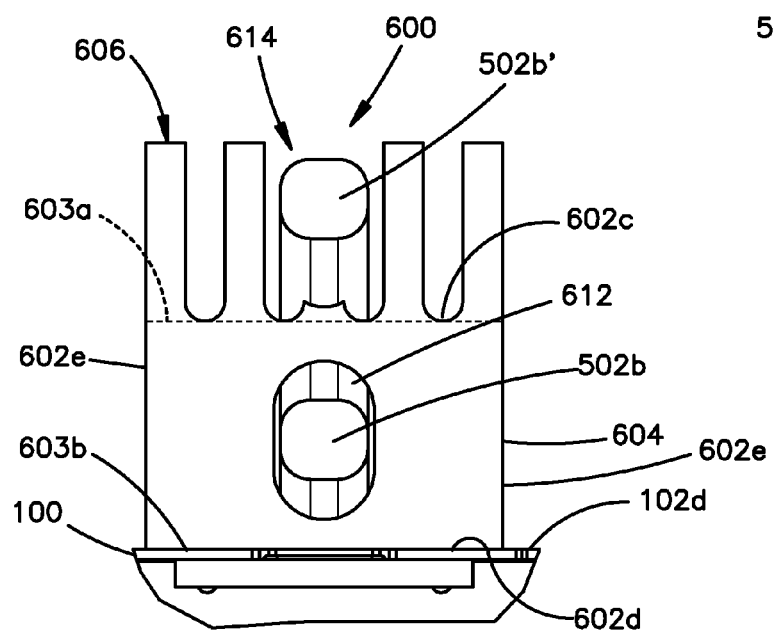
FIG. 13C is a front elevation view of the light pipe inserted into the heat sink illustrated in FIG. 13B.

Referring now to FIGS. 13A-C, a light pipe 500 and a second light pipe 500' can share a common attachment member 510 and be connected to one another in accordance with an alternative embodiment. For instance, the light pipe 500 can be connected to the second light pipe 500' by a beam 542 that extends between the proximal end 502a of the light pipe 500 and the proximal end 502a' of the second light pipe 500' substantially parallel to the longitudinal direction L. In accordance with the illustrated embodiment, the light pipe 500 can be connected to the common attachment member 510, and the second light pipe 500' can be attached to the light pipe 500 by the beam 542. The illustrated common attachment member 510 has engagement members substantially identical to those illustrated in FIGS. 7-8C, but any other suitable engagement members can be utilized as desired.

In accordance with the illustrated embodiment, the respective proximal ends 502a, 502a' of the light pipe 500 and the second light pipe 500' are spaced from one another along the first direction and are aligned with one another along the first direction. It can therefore be said that the light pipe 500 and the second light pipe 500' are disposed in a stacked configuration relative to one another. Alternatively, the respective proximal ends 502a, 502a' of the light pipe 500 and the second light pipe 500' can be offset with respect to each other along the third direction. The proximal end 502a of the light pipe 500 can be configured to at least partially enclose a light emitting element, and the proximal end 502a' of the second light pipe 500' can be configured to at least partially enclose a second light emitting element that can be disposed adjacent to the light emitting element. In accordance with the illustrated embodiment, the second light pipe 500' is constructed differently than the light pipe 500. More specifically, the body 502' of the second light pipe 500' has a length defined by the proximal and distal ends 502a', 502b', that is longer than that of the light pipe 500, such that the distal end 502b' of the second light pipe 500' is disposed proximate the distal end 502b of the light pipe 500 and proximate the front end 102a of the guide frame 100.

In accordance with the illustrated embodiment, a heat sink 600 can be configured to receive at least a portion of the light pipe 500 and at least a portion of the second light pipe 500'. For example, the heat sink body 602 can define a bore 612 that extends through the heat sink body 602 from the front end 602a through the rear end 602b, and a channel 614 that extends along the heat sink body 602, the bore 612 sized to receive the at least a portion of the light pipe 500 and the channel 614 sized to receive the at least a portion of the second light pipe 500' therein, respectively, in respective clearance fits. The bore 612 and the channel 614 can be spaced from each other and aligned with respect to each other along the second direction, and can extend substantially parallel with respect to each other. The bore 612 can be sized such that the light pipe 500 floats in the bore and the channel 614 can be sized such that the second light pipe 500' floats in the channel. In accordance with the illustrated embodiment, the bore 612 and the channel 614 are substantially aligned relative to one another along the lateral or third direction, but alternatively can be offset relative one another along the third direction, along at least a portion, such as the entirety of the respective lengths of the bore 612 and the channel 614 defined by the front and rear ends 602a-b of the heat sink body 602. The heat sink body 602 is not limited to the illustrated bore 612 and channel 614. Alternatively, the heat sink 600 can be constructed with a pair of bores 612 spaced from each other along the transverse direction T, each bore 612 configured to a respective at least a portion of the light pipe 500 and the second light pipe 500'.

Referring now to FIG. 14, an alternative embodiment of a light pipe 500 and a second light pipe 500' can share a common attachment member and be connected to one another in accordance with another alternative embodiment. In accordance with the illustrated embodiment, the light pipe 500 is connected to the second light pipe 500' by a pair of beams 540 that extend between the proximal end 502*a* of the light pipe 500 and the proximal end 502*a'* of the second light pipe 500' substantially parallel to the lateral direction A. The common attachment member 510 is supported by the second light pipe 500'. The proximal ends 502*a*, 502*a'* of the light pipe 500 and the second light pipe 500' can be spaced apart from each other along the lateral direction A such that at least a portion of the light pipe 500 can be received in the bore of a first heat sink and at least a portion of the second light pipe 500' can be received in the bore of a second heat sink that is disposed adjacent the first heat sink relative to a guide frame to which the first and second heat sinks can be coupled. The illustrated common attachment member 510 has engagement members substantially identical to those illustrated in FIGS. 5A-6C, but any other suitable engagement members can be utilized as desired.

Referring now to FIG. 15, it should be appreciated that a plurality of light pipes 500 can be connected to one another using any combination of side by side, stacked, or other appropriate configurations, sharing one or more common attachment members 510. For example, in accordance with the illustrated embodiment, a light pipe 500 is connected to a second light pipe 500' by a pair of beams 540 that extend between the proximal end 502*a* of the light pipe 500 and the proximal end 502*a'* of the second light pipe 500' substantially parallel to the lateral direction A. A third light pipe 500" is connected to the light pipe 500 by a beam 542 that extends between the proximal end 502*a* of the light pipe 500 and the proximal end 502*a"* of the third light pipe 500" substantially parallel to the longitudinal direction L. A fourth light pipe 500' is connected to the second light pipe 500' by a beam 542 that extends between the proximal end 502*a'* of the third light pipe 500' and the proximal end 502*a'* of the second pipe 500' substantially parallel to the longitudinal direction L. The common attachment member 510 is supported by the second light pipe 500'.

The proximal ends 502*a* and 502*a"* of the light pipe and the third light pipe 500" can be spaced from the proximal ends 502*a'* and 502*a'''* of the second light pipe 500' and the fourth light pipe 500''' along the lateral direction A such that at least a portion of the light pipe 500 can be received in a bore that extends through a first heat sink and at least a portion of the third light pipe 500" can be received in a channel that extends along the first heat sink, and at least a portion of the second light pipe 500' can be received in a bore that extends through a second heat sink and at least a portion of the fourth light pipe 500''' can be received in a channel that extends along the second heat sink, the second heat sink disposed adjacent the first heat sink relative to a guide frame to which the first and second heat sinks can be coupled. The illustrated common attachment member 510 has engagement members substantially identical to those illustrated in FIGS. 5A-6C, but any other suitable engagement members can be utilized as desired.

Although the electrical assembly with connector-supported light pipe and pass through heat sink has been described herein with reference to preferred embodiments and/or preferred methods, it should be understood that the words which have been used herein are words of description and illustration, rather than words of limitation, and that the scope of the instant disclosure is not intended to be limited to those particulars, but rather is meant to extend to all structures, methods, and/or uses of the herein described electrical assembly with connector-supported light pipe and pass through heat sink. Those skilled in the relevant art, having the benefit of the teachings of this specification, may effect numerous modifications to the electrical assembly with connector-supported light pipe and pass through heat sink as described herein, and changes may be made without departing from the scope and spirit of the instant disclosure, for instance as recited in the appended claims.

What is claimed:

1. An electrical assembly comprising:
a guide frame having a body that defines a first end and an opposed second end, the guide frame defining at least one cavity that extends between the first and second ends, the at least one cavity configured to at least partially receive an electrical component therein along an insertion direction;
a light pipe having a light pipe body that defines an optical conduit, the light pipe body defining a distal end disposed proximate the first end of the body and an opposed proximal end that is configured to receive light from a light emitting element when the light emitting element is electrically connected to a substrate; and
an electrical connector configured to be mounted to the substrate, the electrical connector including a housing that has a housing body, the electrical connector including a plurality of electrical contacts supported by the housing, the electrical contacts configured to mate with the electrical component so as to place the electrical component into electrical communication with the substrate, the electrical connector including a retainer that extends outwardly from the housing body along the insertion direction and directly secures to the light pipe.

2. The electrical assembly of claim 1, wherein the housing body is coupled to a closed end of the guide frame, the retainer extending through a rear wall of the guide frame.

3. The electrical assembly of claim 1, wherein the retainer extends through an opening defined in a closed end of the guide frame.

4. The electrical assembly of claim 3, further comprising a heat sink coupled to the guide frame and configured to receive at least a portion of the light pipe.

5. The electrical assembly of claim 4, wherein the heat sink is mounted to an upper wall of the guide frame.

6. The electrical assembly of claim 4, wherein the heat sink has a heat sink body that defines body a bore that extends through the heat sink body, and the at least a portion of the light pipe is configured to extend through the bore.

7. The electrical assembly of claim 6, wherein the bore surrounds the at least a portion of the light pipe.

8. The electrical assembly of claim 1, wherein the distal end of the light pipe is oriented along a first direction and the proximal end of the light pipe is oriented along a second direction that is angularly offset relative to the first direction.

9. The electrical assembly of claim 8, further comprising a second light pipe extending between a respective distal end disposed proximate the open end of the body and a respective opposed proximal end configured to at least partially enclose a second light emitting element electrically connected to the substrate, the light pipe and the second light pipe connected to one another.

10. The electrical assembly of claim 9, wherein the respective proximal ends of the light pipe and the second light pipe are spaced from one another along a third direction that is angularly offset with respect to both the first and second directions.

11. The electrical assembly of claim 10, wherein the respective proximal ends of the light pipe and the second light pipe are aligned relative to one another along the third direction.

12. The electrical assembly of claim 10, further comprising a heat sink coupled to the guide frame and configured to receive at least a portion of the light pipe and at least a portion of the second light pipe.

13. The electrical assembly of claim 12, wherein the heat sink has a heat sink body that defines a pair of bores that extend through the heat sink body, the bores spaced from each other along the third direction, each of the at least a portion of the light pipe and the at least a portion of the second light pipe received in a respective one of the pair of bores.

14. The electrical assembly of claim 13, wherein the bores extend substantially parallel with respect to each other.

15. The electrical assembly of claim 9, wherein the respective proximal ends of the light pipe and the second light pipe are spaced from one another along the first direction.

16. The electrical assembly of claim 15, wherein the respective proximal ends of the light pipe and the second light pipe are aligned relative to one another along the first direction.

17. The electrical assembly of claim 15, further comprising a heat sink coupled to the guide frame and configured to receive at least a portion of the light pipe and at least a portion of the second light pipe.

18. The electrical assembly of claim 17, wherein the heat sink has a heat sink body that defines a bore that extends through the heat sink body and a channel that extends along the heat sink body, the bore and the channel spaced from each other along the second direction, the at least a portion of the light pipe received in the bore and the at least a portion of the second light pipe received in the channel.

19. The electrical assembly of claim 18, wherein the bore and the channel extend substantially parallel with respect to each other.

20. The electrical assembly of claim 1, wherein the light pipe further defines an attachment member that is configured to be coupled to the retainer.

21. The electrical assembly of claim 20, wherein the retainer receives the attachment member.

22. The electrical assembly of claim 1, wherein the at least one cavity is configured to receive the electrical connector such that the electrical connector and the electrical component mate to each other in the at least one cavity.

23. The electrical assembly of claim 1, wherein the proximal end of the light pipe is configured to at least partially enclose the light emitting element.

24. An electrical assembly comprising:
a guide frame having a body that defines a first end and an opposed second end, and at least one cavity configured to receive an electrical component;
an electrical connector configured to be mounted to a substrate, the electrical connector including a connector housing and a plurality of electrical contacts that are supported by the connector housing, the electrical contacts configured to place the electrical component into electrical communication with the substrate when the electrical connector is mated to the electrical component;
a light pipe having a distal end disposed proximate the first end of the body and an opposed proximal end configured to receive light from a light emitting element that is electrically connected to the substrate; and
a heat sink coupled to an upper wall of the guide frame, the heat sink having a heat sink body and cooling members that extend from the heat sink body, the heat sink defining a bore that extends through the heat sink body, the bore configured to receive at least a portion of the light pipe.

25. The electrical assembly of claim 24, further comprising a retainer that is supported by one of the electrical connector and the guide frame, the retainer configured to directly secure to the light pipe.

26. The electrical assembly of claim 25, wherein the light pipe has a proximal end opposite the distal end, a distal portion disposed between the distal end and the proximal end, and a proximal portion disposed between the distal portion and the proximal end, wherein the proximal portion is substantially perpendicular to the distal portion, and the retainer is configured to directly secure to the proximal portion of the light pipe.

27. The electrical assembly of claim 25, wherein the cavity is configured to receive the electrical component along an insertion direction, and the retainer extends outwardly from the guide frame along the insertion direction.

28. The electrical assembly of claim 25, wherein the cavity is configured to receive the electrical component along an insertion direction, and the retainer extends outwardly from a housing body of the connector housing along the insertion direction.

29. The electrical connector of claim 25, wherein the light pipe further defines an attachment member that is configured to be coupled to the retainer.

30. The electrical connector of claim 29, wherein the attachment member is configured to be received by the retainer.

* * * * *